US009778738B2

(12) United States Patent
Sugimoto et al.

(10) Patent No.: US 9,778,738 B2
(45) Date of Patent: Oct. 3, 2017

(54) OPERATION DISPLAY SYSTEM AND OPERATION DISPLAY METHOD

(71) Applicant: KONICA MINOLTA, INC., Chiyoda-ku (JP)

(72) Inventors: Yasuaki Sugimoto, Hachioji (JP); Tsutomu Yamazaki, Odawara (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/167,050

(22) Filed: Jan. 29, 2014

(65) Prior Publication Data
US 2014/0232747 A1    Aug. 21, 2014

(30) Foreign Application Priority Data

Feb. 15, 2013 (JP) ................... 2013-027878

(51) Int. Cl.
*G09G 3/00* (2006.01)
*G02B 27/01* (2006.01)
(Continued)

(52) U.S. Cl.
CPC ............ *G06F 3/011* (2013.01); *G02B 27/017* (2013.01); *G06F 3/017* (2013.01); *G06F 3/0304* (2013.01);
(Continued)

(58) Field of Classification Search
CPC .............. G02B 27/0101; G02B 27/017; G02B 27/0172; G09G 3/003
(Continued)

(56) References Cited

U.S. PATENT DOCUMENTS 6,304,234 B1    10/2001  Horiuchi
2002/0060648 A1*  5/2002  Matsui et al. ................. 345/8
(Continued)

FOREIGN PATENT DOCUMENTS

JP          07-078055 A    3/1995
JP          H10-240491 A   9/1998
(Continued)

OTHER PUBLICATIONS

Decision issued in corresponding Japanese Patent Application No. JP2013-027878, dated Jan. 15, 2015, and English translation thereof.

*Primary Examiner* — Zhengxi Liu
*Assistant Examiner* — Yi Yang
(74) *Attorney, Agent, or Firm* — Buchanan Ingersoll & Rooney PC

(57) ABSTRACT

Disclosed is an operation display system, including: an operation display device including a display unit to display an operation window; an operating unit to receive an operation to the operation window; and a display control unit to change the operation window in accordance with the operation received by using the operating unit; an air operation detecting unit to detect an air operation performed by one user in air apart from the display unit; a virtual operation window creating unit to create a virtual operation window in which the operation window is changed in accordance with the air operation; and an AR display unit to show the one user an augmented reality space in which the virtual operation window is synthesized with a real space, wherein the display control unit does not change the operation window displayed on the display unit, in accordance with the air operation.

21 Claims, 20 Drawing Sheets

(51) Int. Cl.
*G06F 3/01* (2006.01)
*G06T 11/60* (2006.01)
*G06F 3/03* (2006.01)
*G06F 3/0481* (2013.01)
*G06T 11/00* (2006.01)

(52) U.S. Cl.
CPC ............ *G06F 3/0481* (2013.01); *G06T 11/00* (2013.01); *G06T 11/60* (2013.01); *G02B 2027/014* (2013.01); *G02B 2027/0138* (2013.01); *G02B 2027/0187* (2013.01)

(58) Field of Classification Search
USPC .................................. 345/7–9, 633; 359/630
See application file for complete search history.

(56) References Cited

U.S. PATENT DOCUMENTS

| | | | | |
|---|---|---|---|---|
| 2008/0034104 | A1* | 2/2008 | Kariti et al. | ................ 709/231 |
| 2010/0231581 | A1* | 9/2010 | Shroads | ................ G06T 11/206 345/419 |
| 2010/0245245 | A1* | 9/2010 | Yamada et al. | ................ 345/158 |
| 2010/0328251 | A1* | 12/2010 | Sinclair | ........................ 345/174 |
| 2011/0216060 | A1* | 9/2011 | Weising et al. | ................ 345/419 |
| 2012/0075344 | A1* | 3/2012 | Aoki | ................ G06F 17/30905 345/633 |
| 2012/0262486 | A1* | 10/2012 | Raghoebardajal | ...... G06F 3/011 345/633 |
| 2013/0147793 | A1* | 6/2013 | Jeon | ........................ G06F 3/011 345/419 |

FOREIGN PATENT DOCUMENTS

| | | |
|---|---|---|
| JP | 2002-157606 A | 5/2002 |
| JP | 2002-318652 A | 10/2002 |
| JP | 2006-126936 A | 5/2006 |
| JP | 2006-155172 A | 6/2006 |
| JP | 2006-277239 A | 10/2006 |
| JP | 2009-146333 A | 7/2009 |
| JP | 2010-217719 A | 9/2010 |
| JP | 2012-198608 A | 10/2012 |

* cited by examiner

OPERATION DISPLAY SYSTEM AND OPERATION DISPLAY METHOD

BACKGROUND OF THE INVENTION

Field of the Invention

The present invention relates to an operation display system and an operation display method, for displaying an augmented reality space in which an image of an operation window is synthesized with a real space.

Description of Related Art

Various types of technologies for displaying an augmented reality space in which an image created by a computer and the like is synthesized as AR (Augmented Reality) information with a real space, on a head-mounted display device and the like, have been proposed.

For example, the following technology is disclosed (for example, refer to Japanese Patent Application Publication Nos. 07-078055 and 2009-146333). In the above technology, an augmented reality space in which an image of a keyboard created by a computer is synthesized as the AR information with a real space, is displayed on the head-mounted display device, and a user stretches his or her hands to the displayed virtual keyboard in order to operate the keyboard.

Further, the following system is disclosed (for example, refer to Japanese Patent Application Publication No. 2010-217719). In the technology, in case that each of a plurality of users wears the head-mounted display device, by communicating information with other neighboring head-mounted display devices, for example, it is possible to browse the information while the AR information is shared with other users when a collaborative activity is carried out.

In a conference or the like, an operation display device comprising a relatively large display unit (a large panel or a tablet type of computer which is used in a conference system, a large operation panel of a multi-function peripheral, and the like) is shared with a plurality of members. In this case, one member could desire to personally perform a separate operation to a window which is viewed by a plurality of members. For example, one member could desire to change the current window in order to confirm the contents of another window, or one member could desire to personally set a specific function.

However, when a personal operation is performed to the operation display device which is viewed and shared by a plurality of members, the personal operation causes inconvenience to the other members. On the other hand, when a separate operation display device is given to each member and is used in a conference or the like, each member can freely perform a personal operation. However, it is difficult to share information with all of the members. Accordingly, a technology for allowing one user to perform the personal operation and to display another window in accordance with the personal operation while the display state of the operation display device which is used by a plurality of members is maintained to browse the information, is desired.

In the head-mounted display device disclosed in Japanese Patent Application Publication No. 2010-217719, the information can be browsed while the information is shared with other members when a collaborative activity is carried out. However, all of the members browse the same contents, and it is not possible to personally perform separate operations without exerting the influence on the other members. Further, in the technology disclosed in Japanese Patent Application Publication Nos. 07-078055 and 2009-146333, a virtual keyboard displayed in the augmented reality space can be merely operated in the air.

SUMMARY

To achieve at least one of the abovementioned objects, an operation display system reflecting one aspect of the present invention comprises:

an operation display device comprising a display unit configured to display an operation window and to be browsed by a plurality of persons; an operating unit configured to receive an operation to the operation window displayed on the display unit; and a display control unit configured to change the operation window displayed on the display unit, in accordance with the operation received by using the operating unit;

an air operation detecting unit configured to detect an air operation which is an operation performed to the operation window displayed on the display unit by one user in air apart from the display unit;

a virtual operation window creating unit configured to create a virtual operation window in which a content of the operation window is changed in accordance with the air operation detected by the air operation detecting unit; and an AR display unit configured to show the one user an augmented reality space in which an image of the virtual operation window is synthesized with a real space, wherein the display control unit does not change the operation window displayed on the display unit, in accordance with the air operation.

Preferably, the AR display unit shows the one user the augmented reality space in which the image of the virtual operation window is synthesized so as to be overlapped with the display unit in the real space.

Preferably, the AR display unit displays a first item set in accordance with the operation received by using the operating unit and a second item set in accordance with the air operation so as to distinguish the first item from the second item in different display forms in the virtual operation window.

Preferably, the AR display unit is an eyeglass type of head-mounted display device which is worn on a head of the one user.

Preferably, the operation display system further comprises a camera to shoot the real space in an eye direction of the one user, wherein the AR display unit detects fingers of the one user, which are hidden behind the image of the virtual operation window in the augmented reality space, from an image of the real space which is shot by the camera, and synthesizes an image of the detected fingers with the image of the virtual operation window so as to arrange the image of the detected fingers in front of the image of the virtual operation window.

Preferably, the operation display system further comprises a camera to shoot the real space in an eye direction of the one user, wherein the AR display unit detects fingers of the one user, which are hidden behind the image of the virtual operation window in the augmented reality space, from an image of the real space which is shot by the camera, and eliminates a portion of the virtual operation window, in which the detected fingers are hidden.

Preferably, the operation display system further comprises a camera to shoot the real space in an eye direction of the one user, wherein the air operation detecting unit detects the air operation by analyzing an image shot by the camera.

Preferably, the air operation includes at least one of a flick operation in the air, a touch operation in the air and a gesture operation in the air.

Preferably, a setting received by using the operating unit and a setting received in accordance with the air operation from the one user are combined to generate a peculiar setting which is peculiar to the one user.

BRIEF DESCRIPTION OF THE DRAWINGS

The present invention will become more fully understood from the detailed description given hereinafter and the accompanying drawings given by way of illustration only, and thus are not intended as a definition of the limits of the present invention, and wherein.

DETAILED DESCRIPTION OF PREFERRED EMBODIMENT

Hereinafter, a preferred embodiment of the present invention will be explained with reference to the accompanying drawings.

Figure 1:
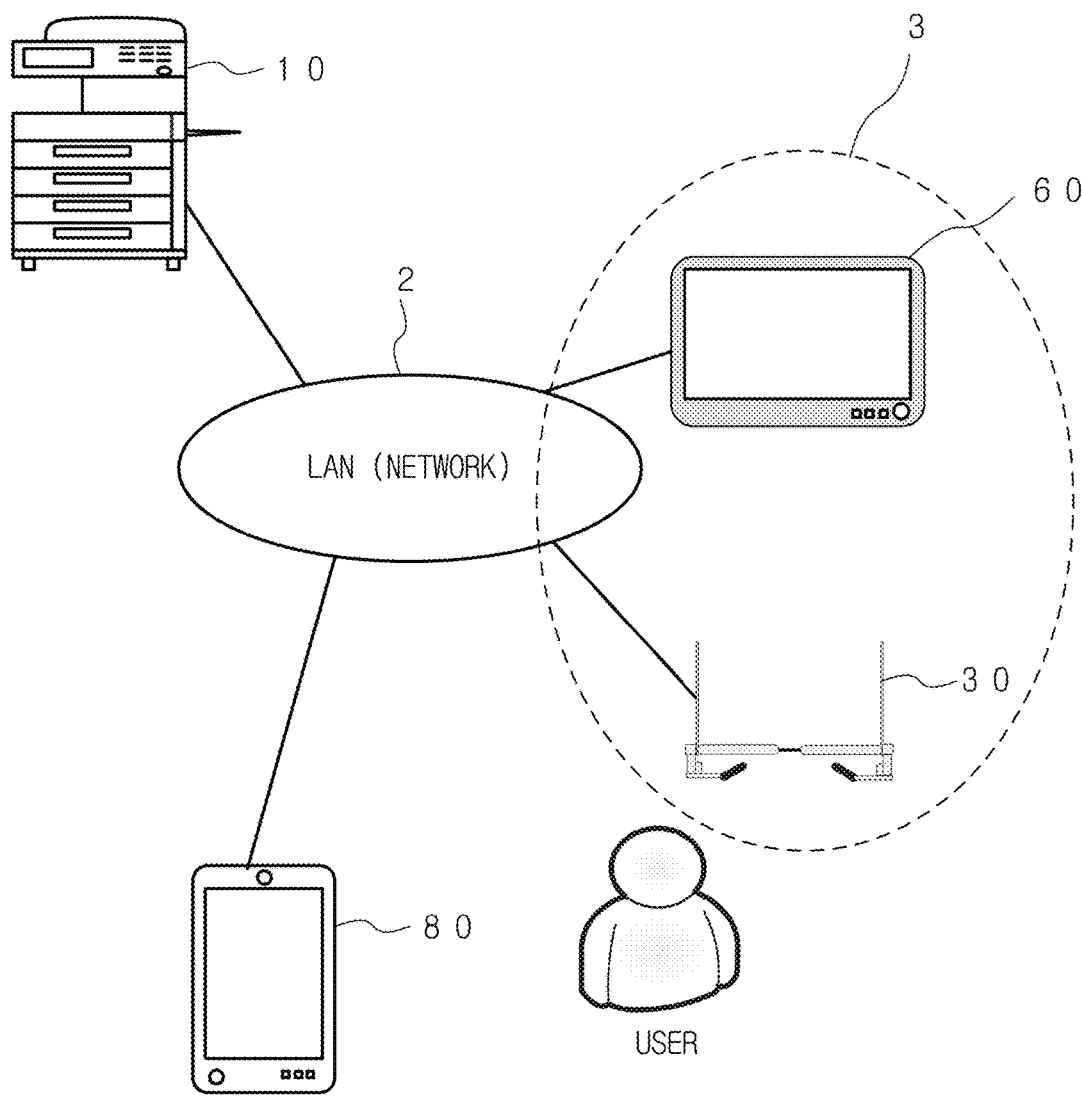
FIG. 1 is a view showing a configuration example of an image processing system comprising the operation display system according to the embodiment.

FIG. 1 shows a configuration example of an image processing system comprising the operation display system 3 according to the embodiment. In the image processing system, an image processing apparatus 10, a separate operation display device 60 which is compatible with the image processing apparatus 10, a head-mounted display (HMD) device 30 which a user wears on his/her head, a portable terminal 80, a PC (personal computer) which is not shown, and the like are connected via a network 2, such as a LAN (Local Area Network) or the like. The operation display system 3 comprises the operation display device 60 and the head-mounted display device 30. The operation display device 60 and the head-mounted display device 30 are connected via the network 2 by the wireless communication.

The image processing apparatus 10 is a so-called multi-function peripheral (MFP) having a copy function of printing an image on recording paper by optically reading an image of an original, a scan function of obtaining image data by reading an image of an original to store the image data as a file or to transmit the image data to an external terminal via the network 2, a printer function of printing out an image on the recording paper by forming the image relating to the print data received from the PC or the like via the network 2, a facsimile function of transmitting and receiving the image data in accordance with the facsimile process, and the like.

The operation display device 60 is a so-called remote operation panel having an operating unit configured to receive various types of operations to the image processing apparatus 10 from the user. Further, the operation display device 60 comprises a relatively large display unit, and can receive the operation while a plurality of persons browse the information displayed on the display unit at the same time.

The head-mounted display device 30 has a function as an AR (Augmented Reality) display unit which shows the user an augmented reality space in which an arbitrary image is synthesized with a real space in the user's eye direction.

In the operation display system 3, the user can perform various types of operations by the touch operation and the like to an operation window displayed on the operation display device 60. The contents of the operation windows displayed on the operation display device 60 are changed in accordance with the touch operation and the like received from the user.

Further, in the operation display system 3, the user who wears the head-mounted display device 30 can perform a predetermined operation to the operation window displayed on the operation display device 60 in the air apart from the operation window. The operation which is performed in the air apart from the operation window as described above, is referred to as the air operation.

The operation display system 3 receives the air operation to the operation window displayed on the operation display device 60, from the user who wears the head-mounted display device 30 and who views the operation window. At this time, the operation display system 3 creates the virtual operation window in case that the contents of the operation window are changed in accordance with the air operation. Further, the operation display system 3 displays the augmented reality space in which an image of the virtual operation window is synthesized as the AR information with the real space in the user's eye direction, on the head-mounted display device 30. On the other hand, the operation window displayed on the operation display device 60 is not changed in accordance with the air operation.

In this manner, in the operation display system 3, while the display state of the operation display device 60 which can be browsed and operated by a plurality of persons is maintained, the user who wears the head-mounted display device 30 performs a personal operation (air operation) to the operation window displayed on the operation display device 60, to confirm the operation window changed in accordance with the operation. Therefore, the user who wears the head-mounted display device 30 can perform the personal operation to the operation window displayed on the operation display device 60 to confirm the operation window changed in accordance with the operation without causing inconvenience to the other users.

Figure 2:
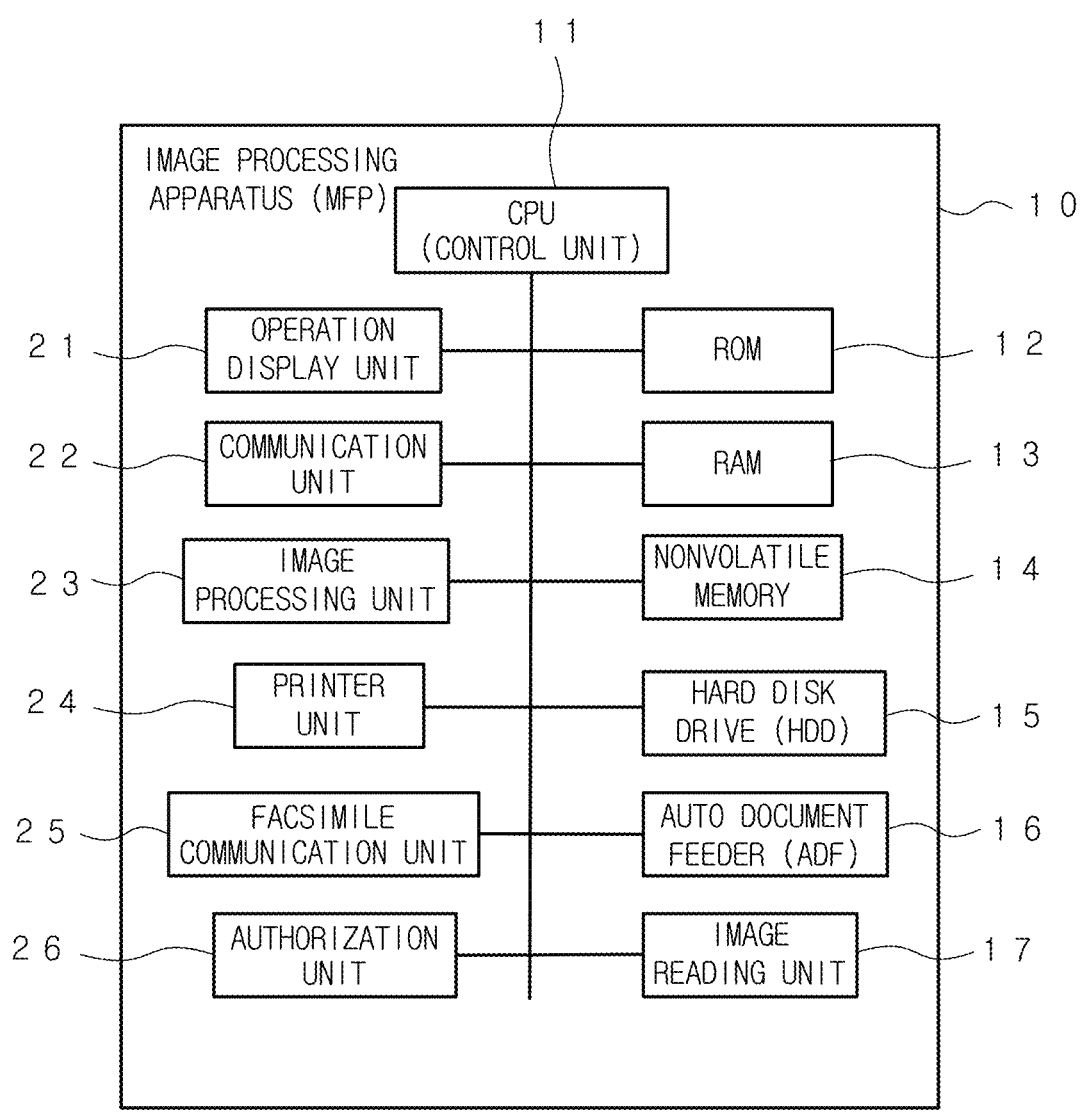
FIG. 2 is a block diagram showing the schematic configuration of the image processing apparatus.

FIG. 2 is the block diagram showing the schematic configuration of the image processing apparatus 10. The image processing apparatus 10 comprises a CPU (Central Processing Unit) 11 for controlling the entire operation of the image processing apparatus 10. The CPU 11 is connected with a ROM (Read Only Memory) 12, a RAM (Random Access Memory) 13, a nonvolatile memory 14, a hard disk drive 15, an auto document feeder (ADF) 16, an image reading unit 17, an operation display unit 21, a communication unit 22, an image processing unit 23, a printer unit 24, a facsimile communication unit 25, an authorization unit 26, and the like via a bus.

By the CPU 11, a middleware, application programs, and the like are executed on an OS (Operating System) program as a base. In the ROM 12, various types of programs are stored. By carrying out various types of processes by the CPU 11 in accordance with these programs, each function of the image processing apparatus 10 is realized.

The RAM 13 is used as a work memory for temporarily storing various data when the CPU 11 carries out the process in accordance with the programs, and an image memory for storing image data.

The nonvolatile memory 14 is a memory (flash memory) in which the stored contents are not damaged even if the image processing apparatus 10 is turned off. The nonvolatile memory 14 is used for storing various types of setting information, and the like. The hard disk drive 15 is a large-capacity nonvolatile storing device. In the hard disk drive 15, various types of programs and data are stored in addition to print data, image data, and the like.

The image reading unit 17 has a function of obtaining image data by optically reading an image of an original. The image reading unit 17 comprises, for example, a light source for irradiating an original with light, a line image sensor for reading the original line by line in the width direction of the original by receiving the reflected light from the original, a moving unit for sequentially moving the reading position line by line in the longitudinal direction of the original, an optical system having lenses, mirrors, and the like for guiding the reflected light from the original to the line image sensor and focusing the reflected light on the line image sensor, a converting unit for converting an analog image signal outputted from the line image sensor into digital image data, and the like.

The auto document feeder 16 has a function of feeding an original set to the document feed tray from the top page sheet by sheet, passing the original through the reading position of the image reading unit 17 and discharging the original to the predetermined discharge position. The image reading unit 17 has a function of reading the original disposed on a platen glass and a function of sequentially reading the original fed by the auto document feeder 16.

The operation display unit 21 has a function of displaying various types of operation windows, setting windows, and the like and receiving an operation, such as the entry of a job and the like, from the user. The operation display unit 21 comprises a display device, such as a liquid crystal display (LCD) or the like, various types of operation switches, such as a start button and the like, and the touch panel provided on the display face of the display unit. The touch panel detects a coordinate position on which the display face of the display device is contacted by using a touch pen, a user's finger, or the like.

The communication unit 22 has a function of communicating with the operation display device 60, the PC, and an external device, such as a server and the like via the network 2. Further, the communication unit 22 has a function of the wireless communication with the head-mounted display device 30 and the portable terminal 80.

The image processing unit 23 carries out the rasterizing process for converting print data into image data, the compression/decompression process for the image data, and the like in addition to the processing, such as the enlargement/reduction or the rotation of image data.

The printer unit 24 has a function of forming an image on the recording paper in accordance with the image data. In this embodiment, the printer unit 24 is configured as a so-called laser printer comprising a conveying device for the recording paper, a photoconductive drum, a charging device, a laser unit, a developing device, a transfer and separation device, a cleaning device, and a fixing device. The laser printer forms an image by the electrophotographic process. An image may be formed by another process.

The facsimile communication unit 25 has a function of transmitting and receiving the image data to/from an external device having the facsimile function via the telephone line.

The authorization unit 26 authorizes the user who uses the image processing apparatus 10. The method for authorizing the user may be optional. For example, a password, a fingerprint, a vein or the like may be used to authorize the user.

Figure 3:
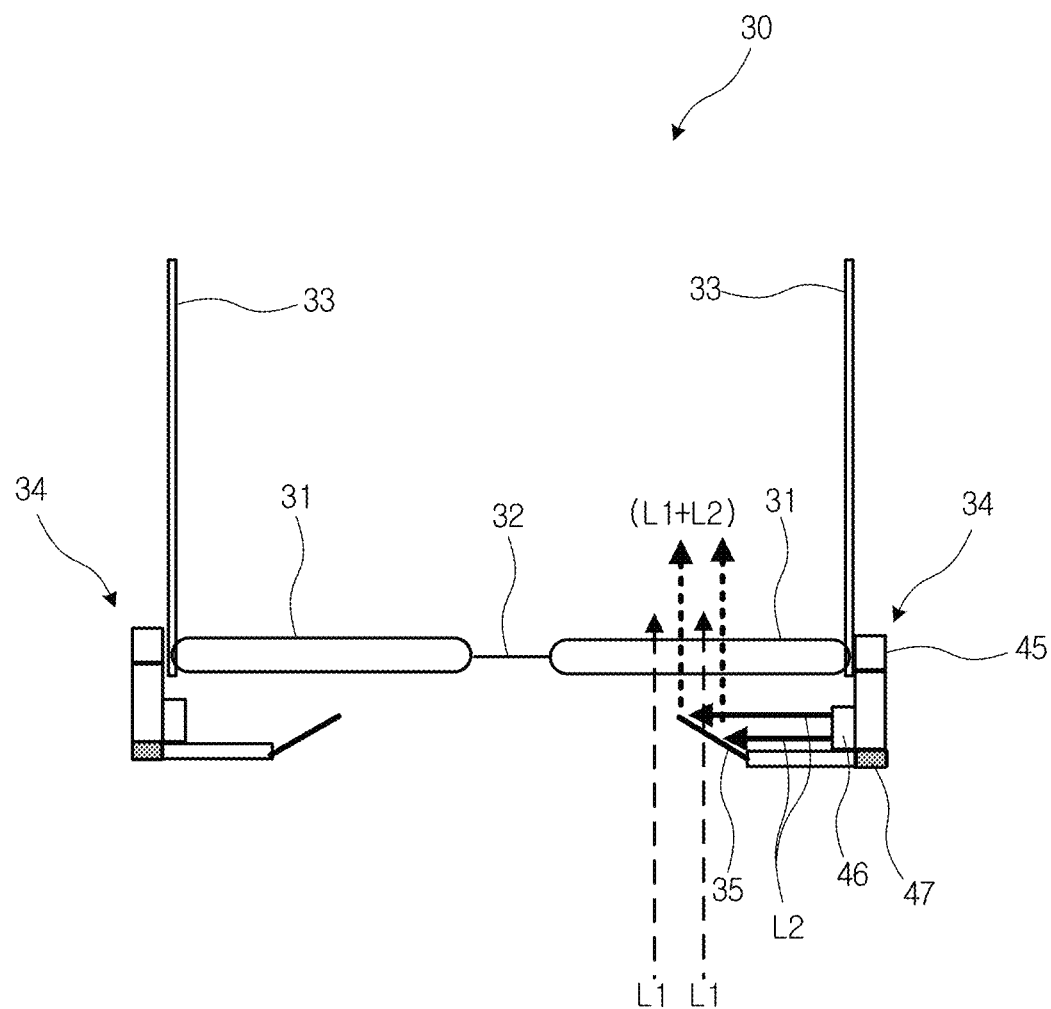
FIG. 3 is a view showing the external appearance and the configuration of the head-mounted display device.

FIG. 3 shows the schematic configuration of the head-mounted display device 30. The head-mounted display device 30 has a form of an eye glasses, and is used by mounting it on a human's head. In the head-mounted display device 30 of this embodiment, the system in which an image is overlapped with the outside scene by using half mirrors (so-called, the light transmission type), is adopted.

The head-mounted display device 30 comprises display units 31 which are arranged in front of the user's right and left eyes, respectively when the user wears the head-mounted display device 30, a bridge 32 for connecting between the right and left display units 31, temples 33 which extend in the same direction from each end portion of the right and left display units 31 connected by the bridge 32 and which are put on the user's ears, and the like. For example, the display units 31 correspond to lenses of eye glasses, and are configured by a transparent member. However, the display units 31 are not required to have an effect of the visual correction.

On each end portion of the display units 31, a main unit 34 including a control circuit, a projecting unit 46, a camera unit 47, and the like, is provided. Further, a half mirror 35 is supported by a support member extending from each of the right and left main units 34 so as to be arranged in front of each display unit 31.

The half mirror 35 is provided so as to slant at the angle of 45 degree with respect to the light L1 which is incident from the front of the head-mounted display device 30 to the display unit 31. The projecting unit 46 of the main unit 34 projects the image (which is the image light L2 for forming the augmented reality information (AR information)) to the half mirror 35. The half mirror 35 is formed by coating a reflective film (a metal film and a dielectric film) on a transparent substrate (glass substrate). In the half mirror 35, for example, the ratio of the amount of the transmitted light to the amount of the reflected light is 1:1.

The light obtained by synthesizing the outside light L1 corresponding to the real space and the image light L2 corresponding to the AR information at the ratio of 1:1 is incident to eyes of the user who wears the head-mounted display device 30 via the display units 31. That is, the head-mounted display device 30 has a function of showing the user the augmented reality space in which the outside scene (real space) is overlapped with the image (AR information) projected by the projecting unit 46.

Figure 4:
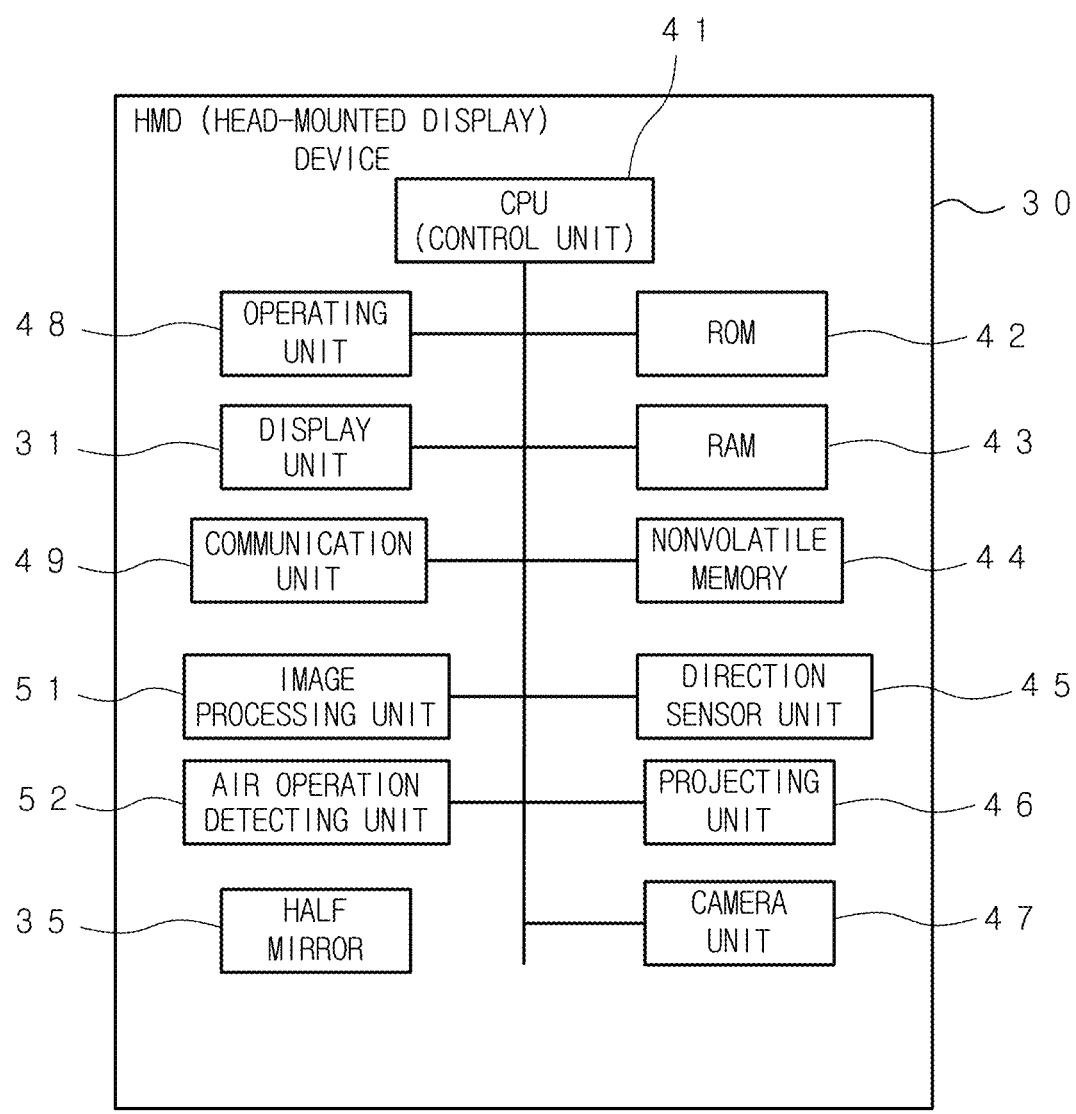
FIG. 4 is a block diagram showing the schematic configuration of the head-mounted display device.

FIG. 4 is the block diagram showing the configuration of the head-mounted display device 30. The head-mounted display device 30 comprises a CPU 41 which functions as a control unit, a ROM 42, a RAM 43, a nonvolatile memory 44, a direction sensor unit 45, the projecting unit 46, the camera unit 47, an operating unit 48, the display unit 31, a communication unit 49, an image processing unit 51, an air operation detecting unit 52, and the like, which are connected with the CPU 41 via a bus.

The CPU 41 controls the operation of the head-mounted display device 30 in accordance with programs stored in the ROM 42. In the ROM 42, the programs, fixed data, and the like are stored. The RAM 43 is used as a work memory for temporarily storing various data when the CPU 41 executes the programs. In the nonvolatile memory 44, various types of setting information are stored.

The direction sensor unit 45 detects the direction and the posture of the head-mounted display device 30 and the change in the direction and the posture. The direction sensor unit 45 comprises a plurality of geomagnetic sensors and a plurality of acceleration sensors so as to combine them. The direction sensor unit 45 detects the posture of the user who wears the head-mounted display device 30, the direction in which the user faces, and the angle at which the user faces (the direction and the angle which are detected by the direction sensor unit 45 are coincident with the shooting direction and the shooting angle of the camera unit 47). Further, in case that the head-mounted display device 30 is inclined, the direction sensor unit 45 detects the direction and the speed of the motion of the head-mounted display device 30. Then, the direction sensor unit 45 transmits the detection result to the CPU 41. In accordance with the detection result transmitted from the direction sensor unit 45, the CPU 41 recognizes the posture of the user who wears the head-mounted display device 30, the angle of the head-mounted display device 30, and the direction and the speed of the motion of the head-mounted display device 30, which is caused by inclining the head-mounted display device 30.

The projecting unit 46 projects the image (which is the image light L2 for forming the augmented reality information) toward the half mirror 35 as described above.

The camera unit 47 carries out the shooting in the front direction of the head-mounted display device 30. In detail, the camera unit 47 carries out the shooting of the real space in the eye direction of the user who wears the head-mounted display device 30. That is, the camera unit 47 carries out the shooting in the range which is substantially the same as the user's field of view in case that the user looks forward. The camera unit 47 is provided on each of the right and left main units 34, and can carry out the stereo shooting. By analyzing the image obtained by the stereo shooting, the distance to each object can be recognized. The camera unit 47 takes the movie, and obtains the images, for example, at 30 frames per second.

The operating unit 48 comprises switches and the like which are provided in the main units 34 and the like, and is used for adjusting the brightness of the projected image and the like.

The communication unit 49 has a function of communicating data with the operation display device 60 and other external devices via the network 2 including the wireless LAN. Further, the communication with the operation display device 60 can be performed by the near field wireless communication without using the network 2.

The image processing unit 51 carries out the enlargement/reduction, the deformation or the like of the image which is projected from the projecting unit 46 to the display unit 31 via the half mirror 35.

The air operation detecting unit 52 detects the air operation by analyzing the image shot by the camera unit 47.

The head-mounted display device 30 is not limited to the light transmission type, but may be the video transmission type. In case of the video transmission type, the user cannot look at the outside scene through the transmission of outside light. However, an image of the outside scene, which is shot by the camera unit 47 is displayed on the display unit 31, and the augmented reality space in which an arbitrary image is synthesized with the image of the outside scene is displayed.

The user who uses the head-mounted display device 30 is set to the head-mounted display device 30. The user may be specified by authorizing the user in a suitable method.

Figure 5:
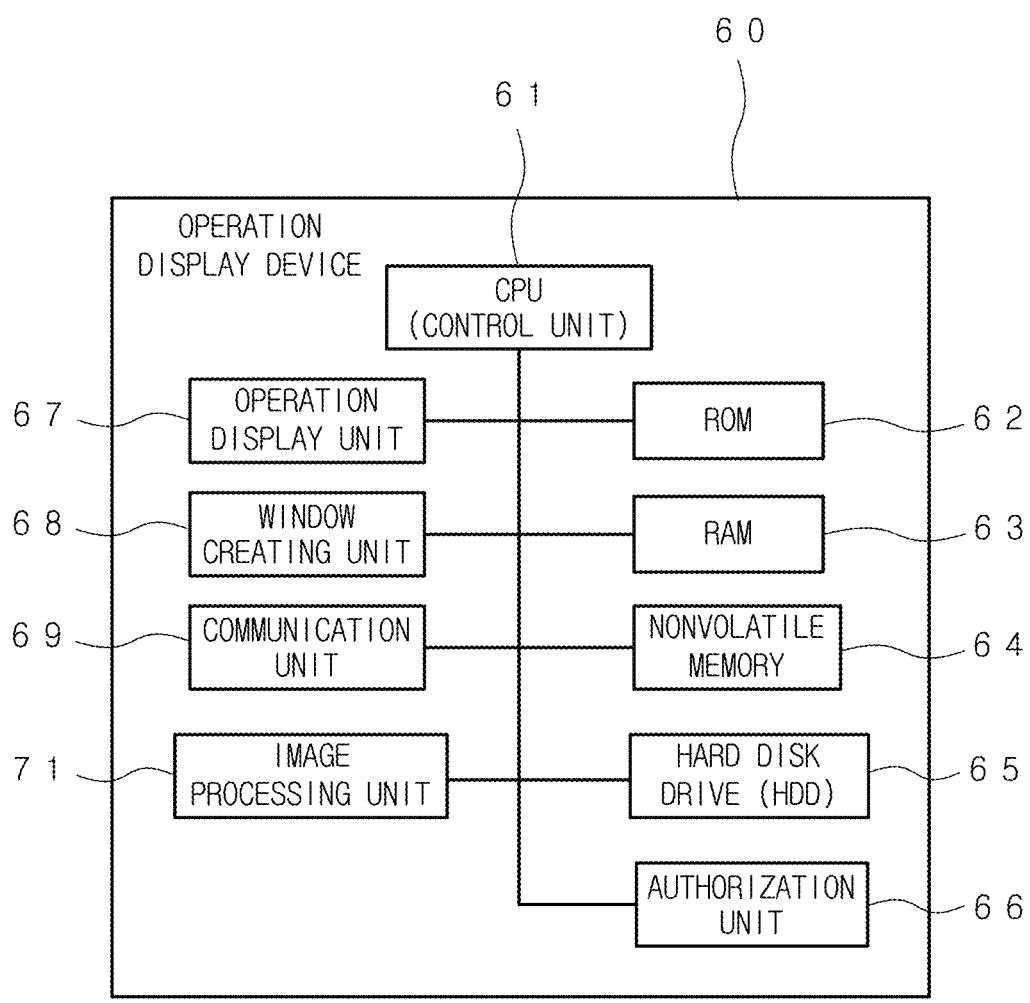
FIG. 5 is a block diagram showing the schematic configuration of the operation display device.

FIG. 5 shows the schematic configuration of the operation display device 60. In the operation display device 60, a CPU 61 is connected with a ROM 62, a RAM 63, a nonvolatile memory 64, a hard disk drive 65, an authorization unit 66, an operation display unit 67, a window creating unit 68, a communication unit 69, an image processing unit 71, and the like via a bus.

The CPU 61 controls the operation of the operation display device 60 in accordance with programs stored in the ROM 62. In the ROM 62, the programs, fixed data, and the like are stored. The RAM 63 is used as a work memory for temporarily storing various data when the CPU 61 executes the programs, and the like. In the nonvolatile memory 64, various types of setting information are stored. The hard disk drive 65 is a large-capacity nonvolatile storing device. In the hard disk drive 65, various types of window data for the operation windows, the window change information (for example, a change table), and the like are stored.

The authorization unit 66 authorizes the user who uses the operation display device 60. When the user is authorized by the operation display device 60, the user is authorized as a user of the image processing apparatus 10 which is apart from the operation display device 60.

The operation display unit 67 has a function of displaying various types of operation windows, setting windows, and the like and receiving an operation, such as the entry of a job, from the user. The operation display unit 67 comprises a display unit, such as a relatively large (for example, about 12 inches) liquid crystal display or the like, and an operating unit having a few operation switches, such as a start button and the like, and a touch panel provided on the display face of the display unit, and the like. The CPU 61 has a function as a display control unit which changes the operation window displayed on the operation display unit 67.

The window creating unit 68 has a function of creating window data for the virtual operation window which is the operation window in case that the contents of the operation window are changed in accordance with the air operation.

The communication unit 69 has a function of communicating data with the external devices, such as the image processing apparatus 10, the head-mounted display device 30, and the like, via the network 2 including the wireless LAN. In addition, the communication unit 69 has a function of the near field wireless communication and can perform the communication with the head-mounted display device 30 by the near field wireless communication.

The image processing unit 71 carries out various types of processings for the image data, such as the rotation, the enlargement/reduction, the deformation of the image data, and the like.

The operation display device 60 can display the same operation window as the operation display unit 21 of the image processing apparatus 10. Further, the operation display device 60 transmits the operation contents received by the operation display unit 67 of the operation display device 60, to the image processing apparatus 10.

Next, in case that the user who wears the head-mounted display device 30 performs the air operation to the operation window displayed on the operation display device 60, the operation of the head-mounted display device 30 and the operation of the operation display device 60 will be explained.

Figure 6:
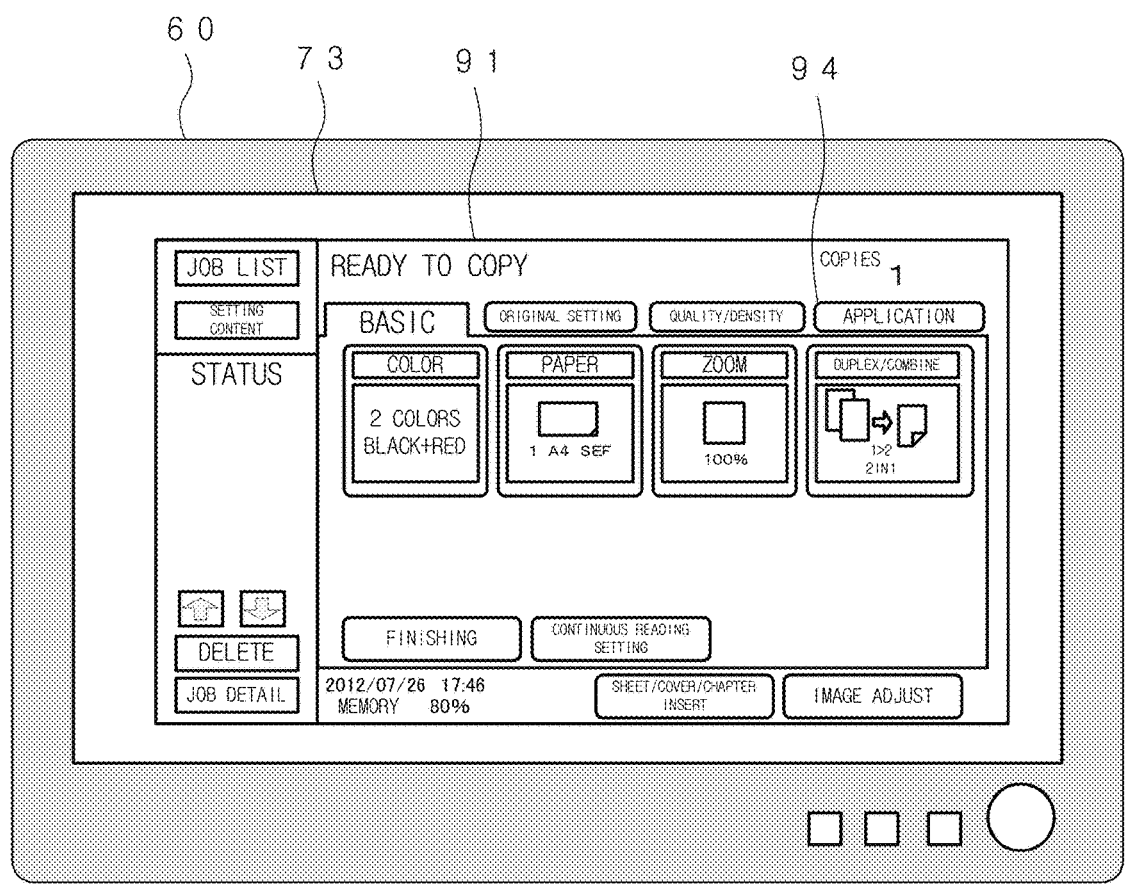
FIG. 6 is a view showing an example of the operation display device on which an operation window of the image processing apparatus is displayed.

FIG. 6 shows an example of the operation display device 60 in the state where the operation window 91 for remotely operating the image processing apparatus 10 is displayed. On the display face 73 of the operation display device 60, the operation window 91 is largely displayed. Accordingly, the operation display device 60 can be browsed and shared by a plurality of persons at the same time. The operation window 91 may be displayed on the display face 73, entirely or almost entirely.

Figure 7:
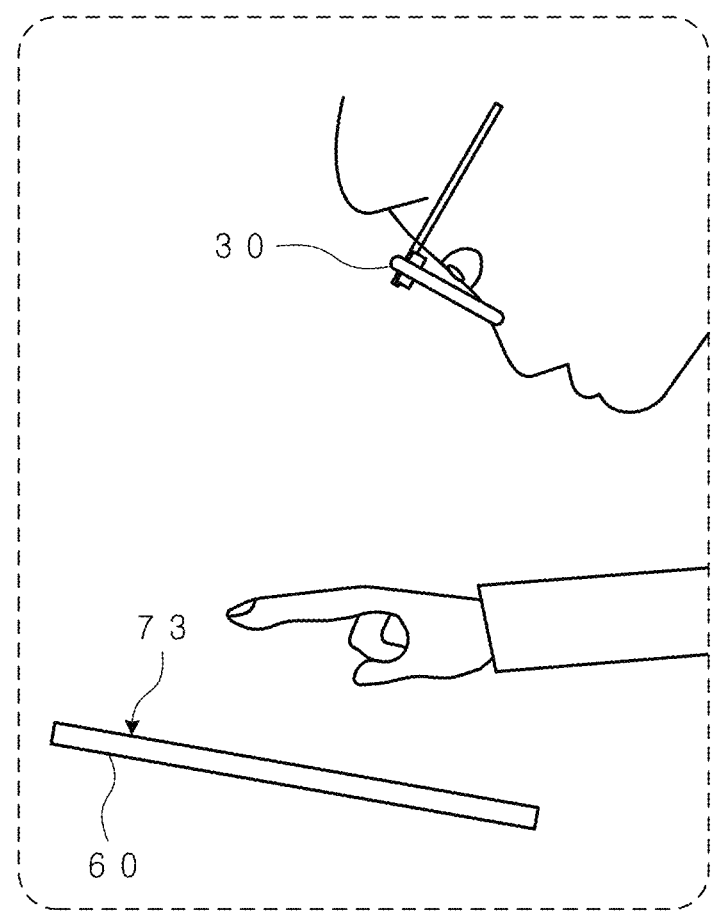
FIG. 7 is a view showing an example of the situation in which a user who wears the head-mounted display device performs an air operation to the operation window displayed on the operation display device.

FIG. 7 shows an example of the situation in which the user who wears the head-mounted display device 30 performs the air operation to the operation window 91 displayed on the operation display device 60. The air operation is performed in the air apart from the display face 73 of the operation display device 60. The air operation includes an air touch operation corresponding to the touch operation to the touch panel, an air flick operation corresponding to the flick operation to the touch panel, an air gesture operation which is a gesture operation in the air, and the like. As long as the air operation is performed in the space between the display unit 31 of the head-mounted display device 30 and the display face 73 of the operation display device 60, the air operation can be performed far apart from the operation display device 60. The air operation is not limited to the operation performed at the distance from the operation display device 60, which is shown in FIG. 7.

Figure 8:
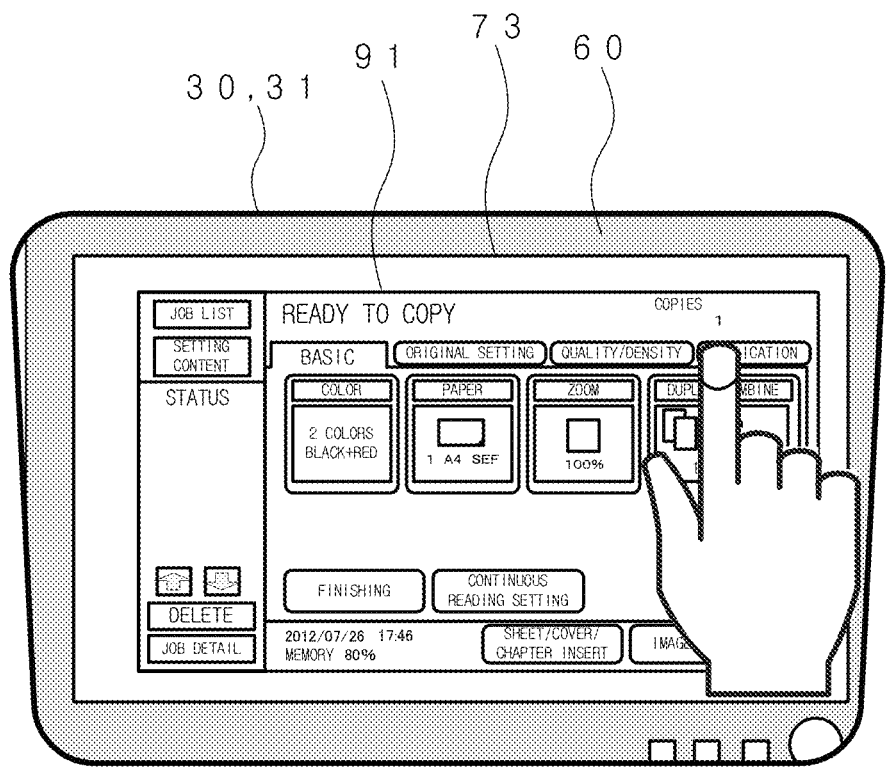
FIG. 8 is a view showing an example of the user's sight through one display unit of the head-mounted display device in the state where the air operation shown in FIG. 7 is performed to the operation window shown in FIG. 6.

FIG. 8 shows an example of the user's sight through one display unit 31 of the head-mounted display device 30 in the state where the air operation of FIG. 7 is performed to the operation window 91 shown in FIG. 6. In FIG. 8, the user views the objects all of which exist in the real space.

In the operation display system 3, when the air operation to the operation window 91 is received from the user who wears the head-mounted display device 30 and who views the operation window 91 of the operation display device 60, the virtual operation window 93 (refer to FIG. 9) to be displayed by changing the contents of the displayed operation window 91 in accordance with the air operation is created. Further, the augmented reality space in which the image of the virtual operation window 93 is synthesized with the real space viewed by the user is displayed on the head-mounted display device 30.

Figure 9:
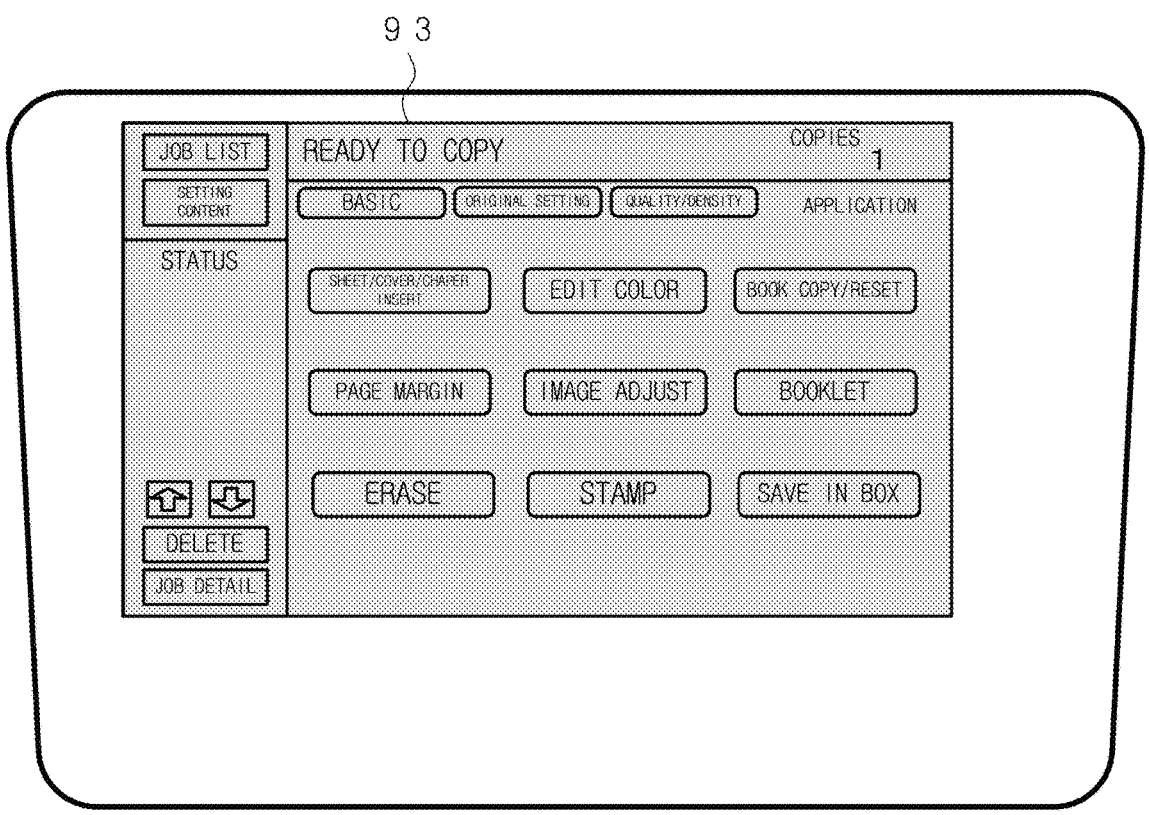
FIG. 9 is a view showing the state where an image of a virtual operation window is displayed on one display unit of the head-mounted display device.

FIG. 9 shows the state where the image of the virtual operation window 93 created by receiving the air operation shown in FIG. 8 to the operation button 94 for the application settings in the operation window 91 shown in FIG. 6 is displayed as the augmented reality information (AR information) on one display unit 31 of the head-mounted display device 30. In FIG. 9, the information which appears in the real space is not shown.

In the virtual operation window 93, the size and the position thereof are adjusted so as to be just overlapped with the operation window 91 displayed on the operation display device 60 in the real space (refer to FIG. 8) viewed by the user who wears the head-mounted display device 30. Then, the virtual operation window 93 is displayed.

Figure 10:
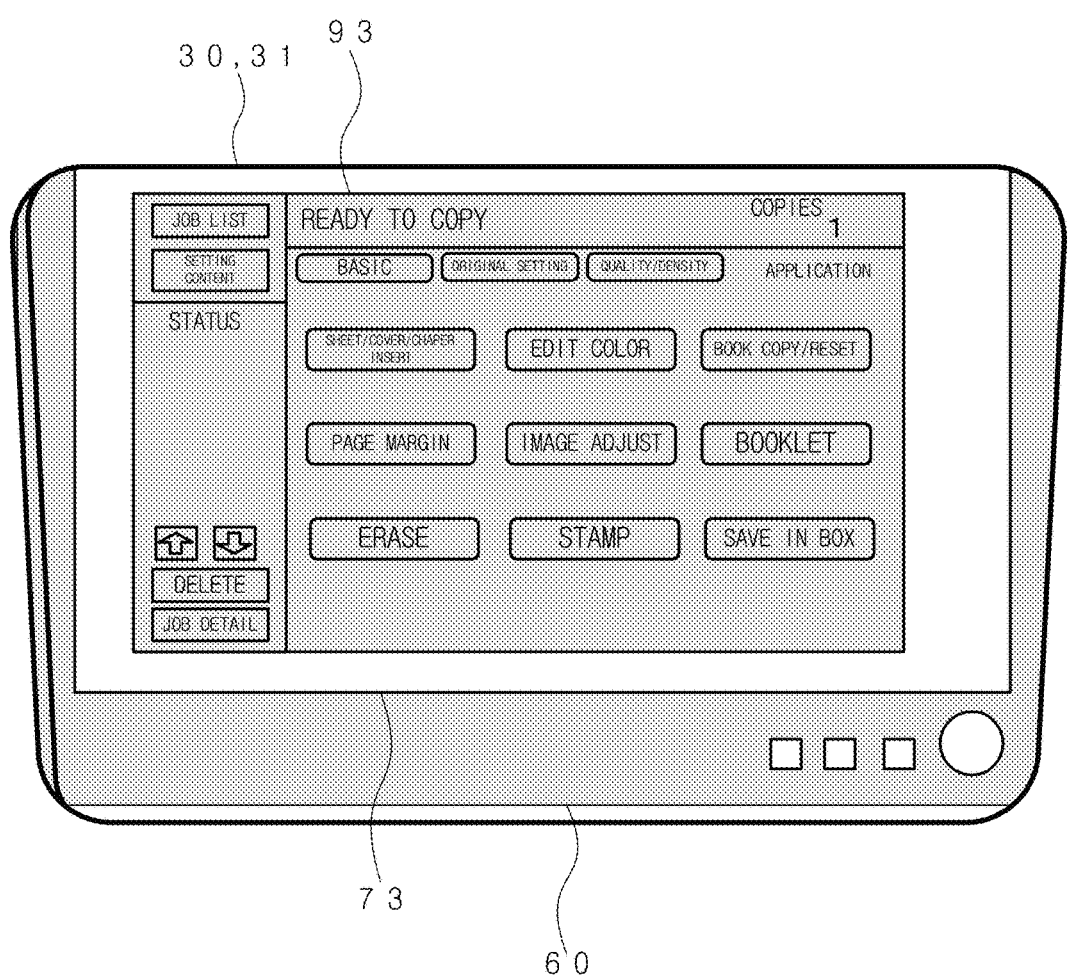
FIG. 10 is a view showing the user's sight through one display unit of the head-mounted display device when the virtual operation window of FIG. 9 is displayed.

FIG. 10 shows the user's sight through one display unit 31 of the head-mounted display device 30 when the virtual operation window 93 of FIG. 9 is displayed. The virtual operation window 93 is displayed so as to be overlapped with the operation window 91 in the real space. Therefore, the user who wears the head-mounted display device 30 views the virtual operation window 93 as if the contents of the operation window displayed on the operation display device 60 in the real space are changed in accordance with the air operation. In this example, the virtual operation window is a non-transparent image which prevents the operation window displayed on the operation display device 60 in the real space, from being transparently viewed through the virtual operation window.

Even if the air operation is received, the operation window displayed on the operation display device 60 is not changed. Accordingly, when the user who wears the head-mounted display device 30 views the virtual operation window 93 shown in FIG. 10, the display state shown in FIG. 6 is maintained in the real operation display device 60. In addition, the user who wears the head-mounted display device 30 can further perform the air operation to the displayed virtual operation window 93.

Figure 11:
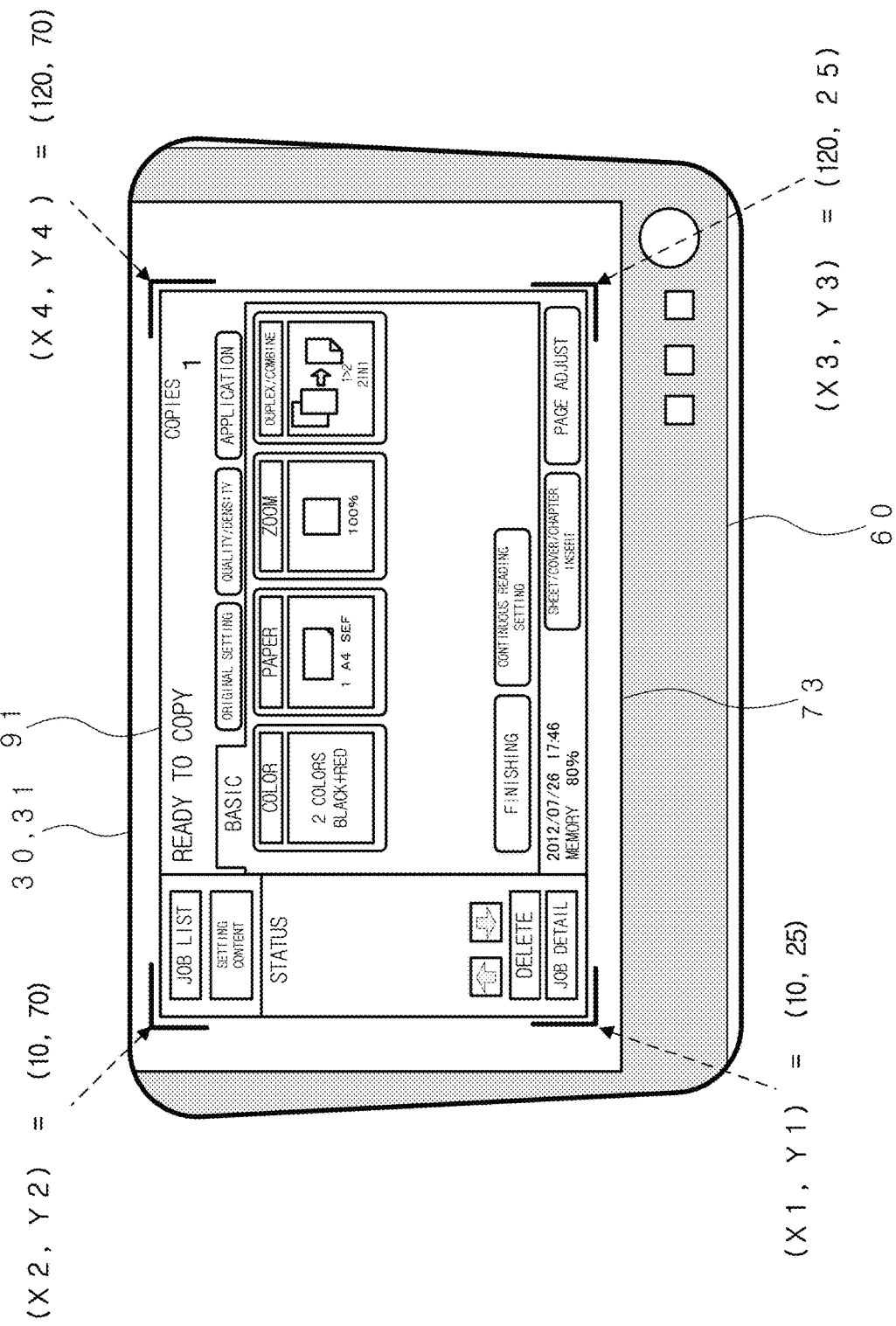
FIG. 11 is a view showing the situation in which the position (the space coordinates in four corners) of the operation window in the real space which is viewed by the user who wears the head-mounted display device, is recognized by analyzing an image shot by the camera unit.

FIG. 11 shows the situation in which the position of the operation window 91 in the real space viewed by the user who wears the head-mounted display device 30, is recognized by analyzing the image shot by the camera unit 47. In this embodiment, when the operation window 91 displayed on the operation display device 60 is detected in the image shot by the camera unit 47 of the head-mounted display device 30, the space coordinates ((X1, Y1), (X2, Y2), (X3, Y3), and (X4, Y4)) in four corners of the operation window 91 are calculated.

Figure 12:
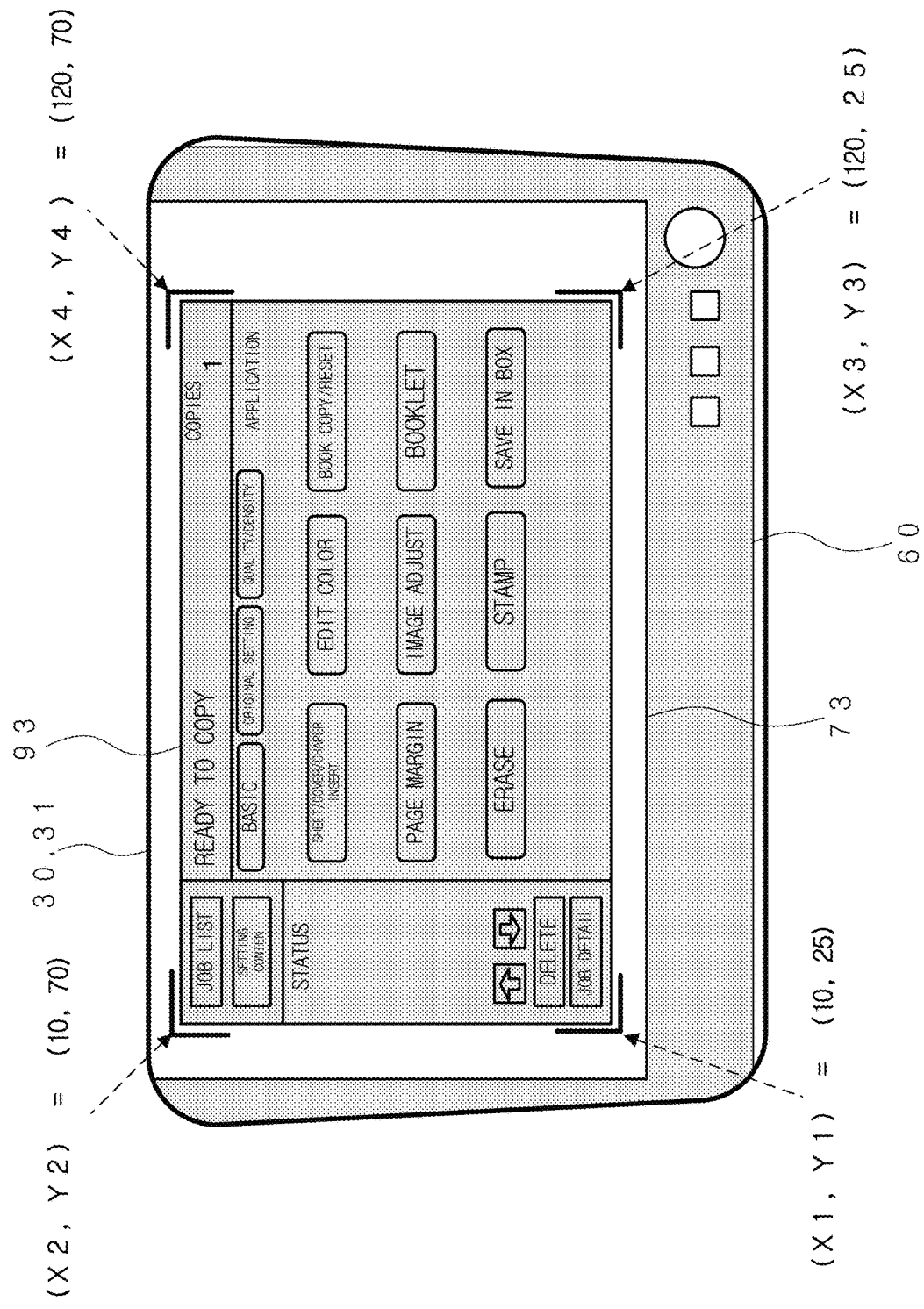
FIG. 12 is a view showing the user's sight through one display unit of the head-mounted display device in the state where the virtual operation window is displayed so as to be overlapped with the operation window displayed on the operation display device, in accordance with the space coordinates in four corners.

FIG. 12 shows the state where the virtual operation window 93 is displayed on one display unit 31 of the head-mounted display device 30 in accordance with of the space coordinates in the four corners, which are calculated as shown in FIG. 11. In the virtual operation window 93 which is the AR information, the position and the size thereof are adjusted so as to be overlapped with the operation window 91 displayed on the operation display device 60 in the real space and so as to be viewed in the same size as the operation window 91 in the real space. Then, the virtual operation window 93 is displayed.

Figure 13:
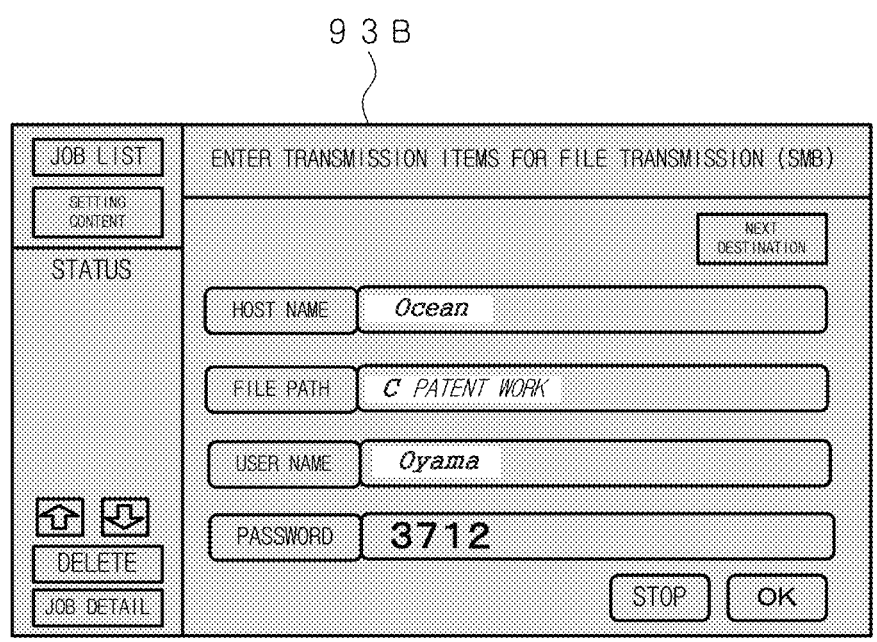
FIG. 13 is a view showing an example of the virtual operation window in which the setting contents which are entered in accordance with the operation received by using the operation display device and the setting contents which are entered in accordance with the air operation are displayed in different forms.

FIG. 13 shows another example of the virtual operation window 93B displayed as the AR information on the head-mounted display device 30 in accordance with the air operation. In the virtual operation window 93B, the setting items set in accordance with the direct operation to the operation display device 60 (operation to the touch panel, the operation switch or the like of the operation display device 60) and the setting items set in accordance with the air operation are displayed in different display forms.

In an example of FIG. 13, the input operation for entering the setting contents relating to the setting items which are a host name, a file path and a user name, is received by using the operation display device 60. The input operation for entering a password is received in accordance with the air operation. For example, the setting items set in accordance with the direct operation to the operation display device 60 and the setting items set in accordance with the air operation, are displayed so as to be distinguished from each other by using different display colors, different font sizes and the like. For example, the password is entered in accordance with the air operation from a virtual keyboard displayed as the AR information. In FIG. 13, the background of characters corresponding to the contents set in accordance with the input operation received by using the operation display device 60 is white, and the background of characters corresponding to the contents set in accordance with the air operation is gray.

In the operation display system 3, by combining the setting which is set in accordance with the operation received by using the operation display device 60 with the setting which is set in accordance with the air operation from the user who wears the head-mounted display device 30, the setting peculiar to the user who wears the head-mounted display device 30 can be generated. For example, the setting which is common to a plurality of users is performed by using the operation display device 60, and the personal information, such as the security information and the like is entered in accordance with the air operation. As a result, the working process for performing a series of settings including the setting which is common to a plurality of users and the personal information, for each user can be reduced. Therefore, it is possible to perform the efficient setting. In addition, the security information, such as the password and the like, can be entered without being secretly viewed by other persons.

The personal setting generated by the above-described combination is directly transmitted from the head-mounted display device 30 to the image processing apparatus 10, and is registered. Alternatively, the personal setting is transmitted from the head-mounted display device 30 to the operation display device 60 and is further transmitted from the operation display device 60 to the image processing apparatus 10, and is registered in the image processing apparatus 10. Alternatively, because the operation display device 60 grasps the virtual operation window 93B displayed on the head-mounted display device 30, the operation display device 60 may generate the above-described combined setting and transmit the combined setting to the image processing apparatus 10 to register the setting.

Next, the method for visually recognizing fingers in the state where the virtual operation window 93 is displayed will be explained.

Figure 14:
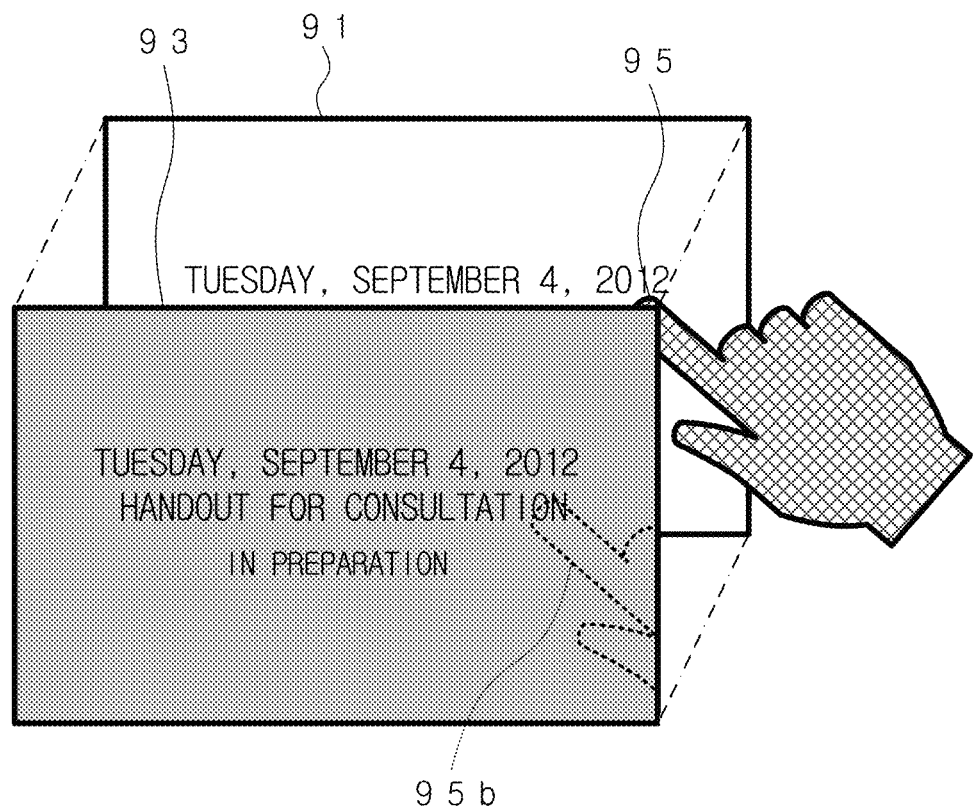
FIG. 14 is a view showing the situation in which fingers positioned in the space between the operation window displayed on the operation display device and the virtual operation window are hidden behind the virtual operation window.

When the virtual operation window 93 is displayed on the head-mounted display device 30 so as to be overlapped with the operation window 91 displayed on the operation display device 60, as shown in FIG. 14, the user who wears the head-mounted display device 30 cannot view his/her fingers 95 which are positioned in the space between the operation window 91 displayed on the operation display device 60 and the virtual operation window 93 because the fingers 95 are hidden behind the virtual operation window 93. In the drawing, the fingers which are hidden behind the virtual operation window 93 are shown by using a broken line 95b.

In this state, after the virtual operation window 93 is displayed, it is difficult for the user to further perform the air operation to the virtual operation window 93. Therefore, in the operation display system 3, in order to be able to visually recognize the fingers 95 when the virtual operation window 93 is displayed, any one of the following two methods for solving the above problem can be used.

<Image Synthesis Method>

Figure 15:
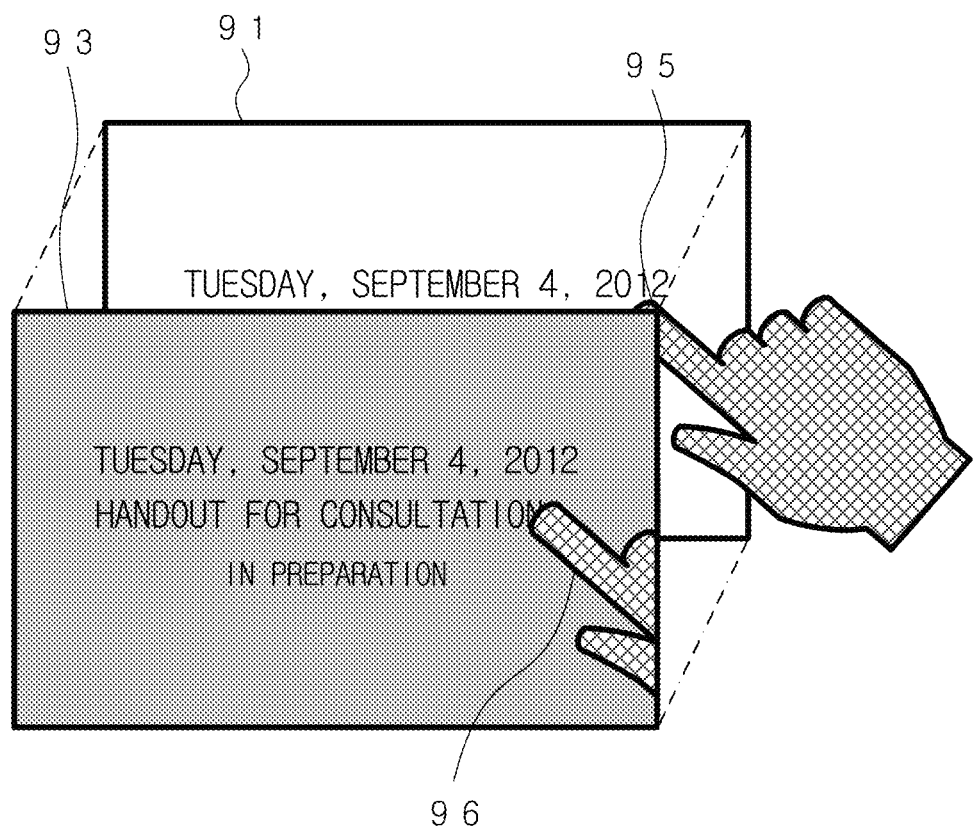
FIG. 15 is a view showing an example of fingers which are displayed by using the image synthesis method.

FIG. 15 shows an example of the fingers which are displayed by using the image synthesis method. In the image synthesis method, a portion of the fingers 95, which is hidden behind the virtual operation window 93 (the portion hidden behind the virtual operation window 93 in the augmented reality space) is detected and extracted from the image shot by the camera unit 47. Further, the image 96 of the hidden portion of the fingers is synthesized so as to be overlapped with the virtual operation window 93, and is displayed as the AR information on the head-mounted display device 30. In place of the real fingers 95, the user who wears the head-mounted display device 30 visually recognizes the image 96 of the fingers, which is displayed as the AR information. The position and the size of the image 96 of the fingers, which is displayed as the AR information are changed in accordance with the movement of the real fingers 95.

<Removal Method>

Figure 16:
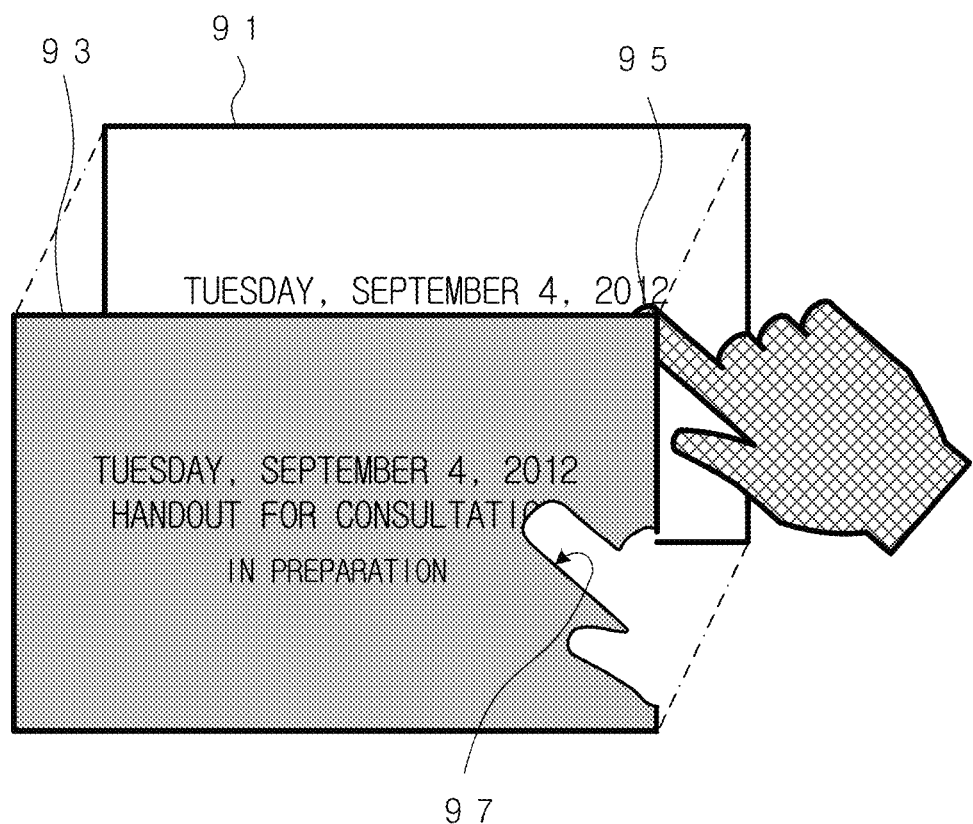
FIG. 16 a view showing an example in which fingers can be visually recognized by using the removal method.

FIG. 16 shows an example in which the fingers are visually recognized by using the removal method. In the removal method, a portion of the fingers 95, which is hidden behind the virtual operation window 93 (the portion hidden behind the virtual operation window 93 in the augmented reality space) is detected from the image shot by the camera unit 47. Further, the image obtained by removing the region (removed portion 97) corresponding to the detected portion of the fingers 95 from the virtual operation window 93 is displayed as the AR information on the head-mounted display device 30. The user who wears the head-mounted display device 30 can visually recognize the real fingers 95 through the removed portion 97. The position and the size of the removed portion 97 are changed in accordance with the movement of the real fingers 95.

Figure 17:
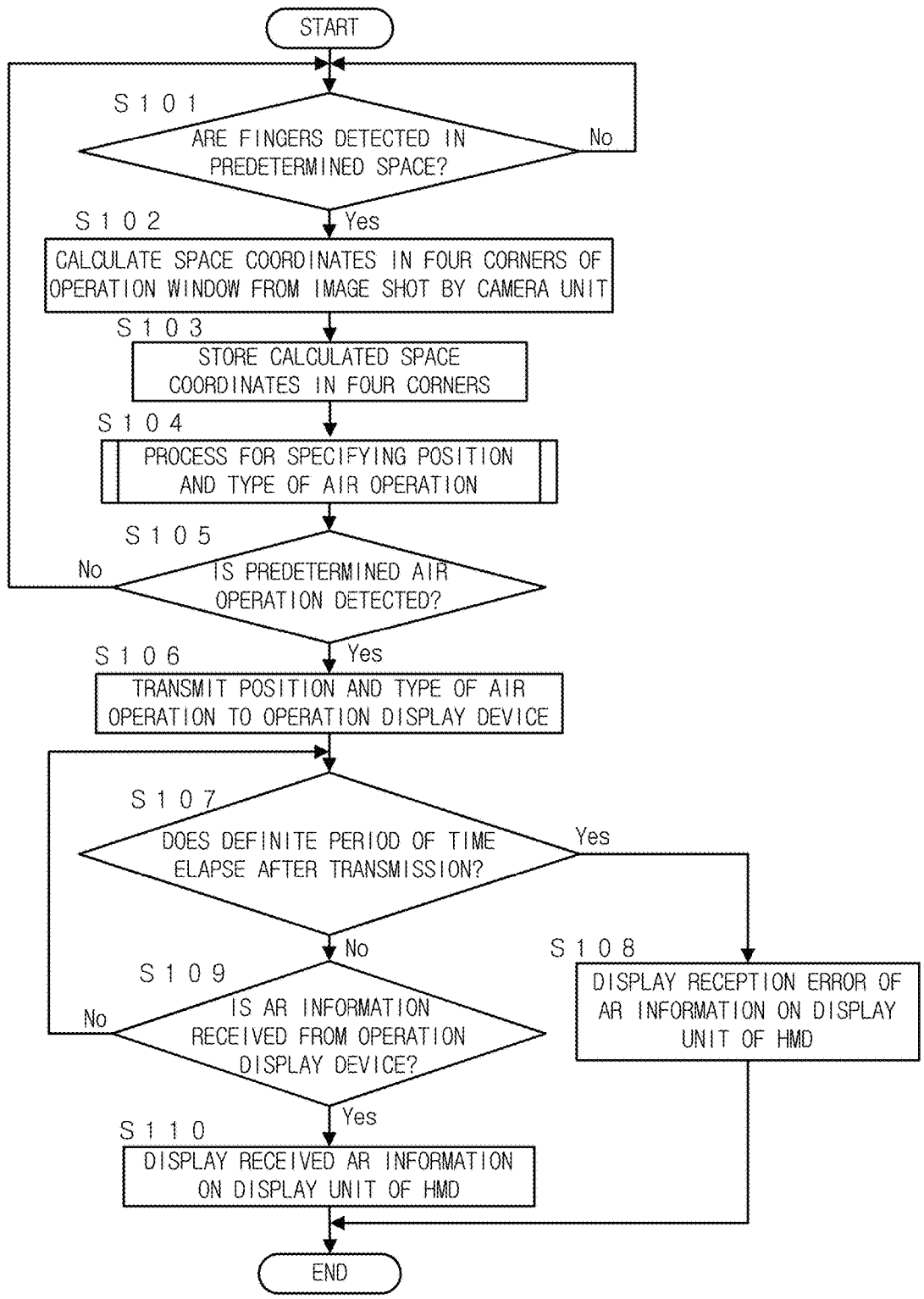
FIG. 17 is a flowchart showing the process which is carried out by the head-mounted display device.

FIG. 17 shows the flowchart of the process relating to the air operation, which is carried out by the head-mounted display device 30. The head-mounted display device 30 of the operation display system 3 analyzes the image shot by the camera unit 47, and successively tries to detect the fingers 95 in the space between the display face of the operation display unit 67 of the operation display device 60 and the display unit 31 of the head-mounted display device 30 (Step S101; No). In case that the fingers 95 are detected in the above-described space (Step S101; Yes), the head-mounted display device 30 calculates the space coordinates in the four corners of the operation window 91 displayed on the operation display device 60 from the image shot by the camera unit 47 (Step S102, refer to FIG. 11). Further, the head-mounted display device 30 stores the calculated space coordinates in the four corners, in the nonvolatile memory 44 (Step S103).

Next, the head-mounted display device 30 carries out the process for specifying the position and the type of the air operation to the operation window 91 displayed on the operation display device 60 (Step S104). Here, the head-mounted display device 30 judges whether the movement of the fingers 95 in the air is one of the air touch operation, the air flick operation and the air gesture operation. The detail of the process in Step S104 will be explained later.

In case that the air operation is not detected (Step S105; No), the process returns to Step S101 and is continued. In case that the air operation is detected (Step S105; Yes), the head-mounted display device 30 transmits the information indicating the position and the type of the detected air operation (referred to as the air operation information) to the operation display device 60 (Step S106).

The operation display device 60 which receives the air operation information creates the image data (AR information) of the virtual operation window 93 in accordance with the displayed operation window 91 and the air operation information, and transmits the image data to the head-mounted display device 30.

In case that the AR information of the virtual operation window 93 is not received from the operation display device 60 even though the definite period of time elapses since the air operation information is transmitted (Step S107; Yes), the head-mounted display device 30 performs the error display indicating that the AR information is not received from the operation display device 60 (Step S108). Then, the process is ended.

On the other hand, in case that the AR information of the virtual operation window 93 is received from the operation display device 60 before the definite period of time elapses since the air operation information is transmitted (Step S107; No and Step S109; Yes), the head-mounted display device 30 displays the received AR information (the virtual operation window 93) on the display unit 31 (Step S110). Then, the process is ended. The process shown in FIG. 17 is successively performed repeatedly.

Figure 18:
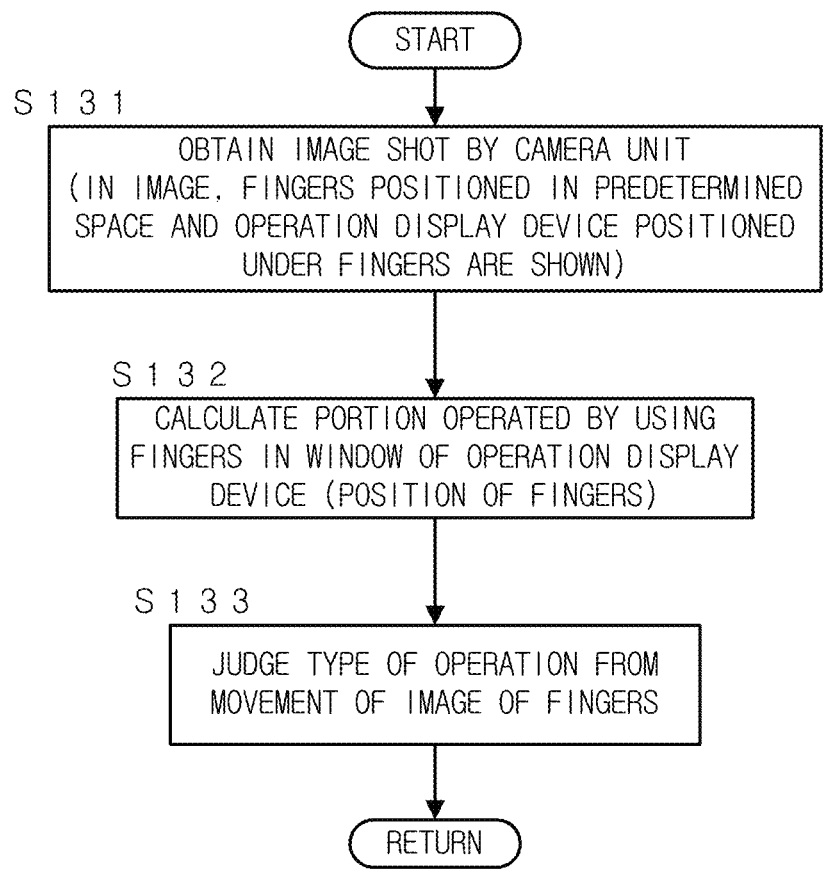
FIG. 18 is a flowchart showing the detail of the process in Step S104 of FIG. 17.

FIG. 18 shows the detail of the process in Step S104 of FIG. 17. First, the image shot by the camera unit 47 is obtained (Step S131). In this image, the operation window 91 displayed on the operation display device 60 and the fingers 95 of the user who performs the air operation to the operation window 91 are shown.

The head-mounted display device 30 specifies the portion operated by using the fingers 95 in the operation window 91 displayed on the operation display device 60 (the position of the fingers 95), from the obtained shot image (Step S132). Next, the head-mounted display device 30 judges the type of the air operation in accordance with the movement of the fingers 95 of which the position is specified in Step S132 (Step S133). In this embodiment, the head-mounted display device 30 previously stores the pattern of the movement of the fingers corresponding to the air touch operation, the pattern of the movement of the fingers corresponding to the air flick operation, and the pattern of the movement of the fingers corresponding to the air gesture operation. Further, the head-mounted display device 30 compares each of the stored patterns with the movement of the fingers 95 in the shot image (pattern matching), and specifies the type of the air operation. In the process shown in FIG. 18, in case that the air operation is detected, the information indicating the position and the type of the air operation is set as the return value. On the other hand, in case that the air operation is not detected, the information indicating that the air operation is not detected is set as the return value.

Figure 19:
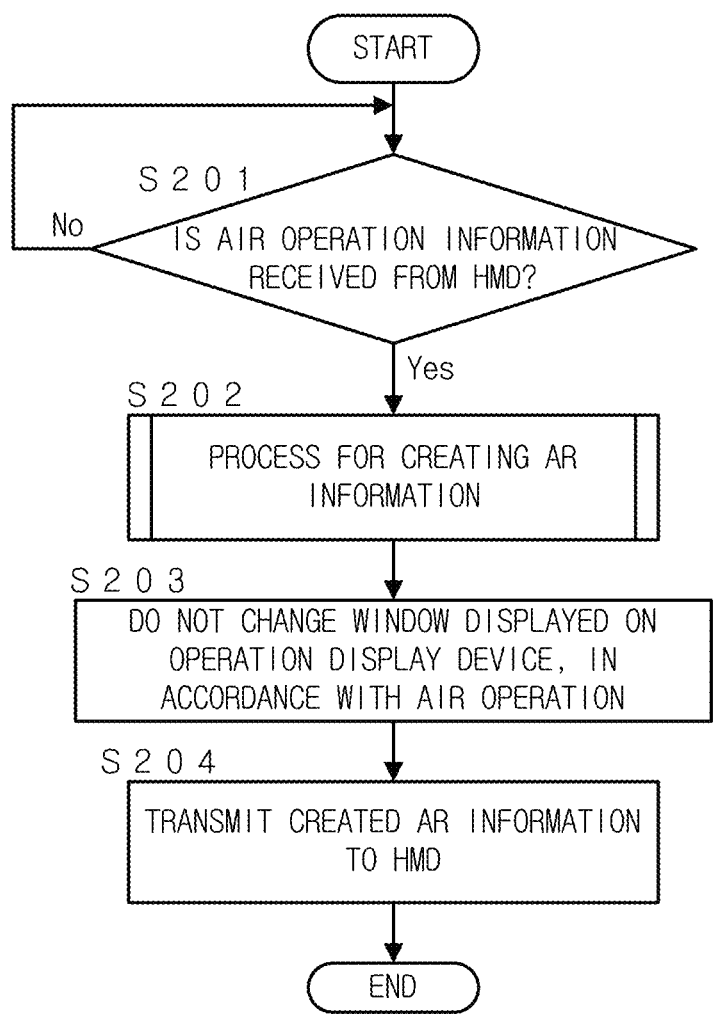
FIG. 19 is a flowchart showing an outline of the process of the operation display device.

FIG. 19 shows an outline of the process of the operation display device 60. The operation display device 60 monitors whether the air operation information is received from the head-mounted display device 30 (Step S201; No). In case that the air operation information is received from the head-mounted display device 30 (Step S201; Yes), the window creating unit 68 of the operation display device 60 creates the virtual operation window (AR information) 93 to be displayed in accordance with the air operation indicated by the air operation information (Step S202). The detail of the process for creating the virtual operation window 93 will be explained later.

Even if the air operation is received, the operation display device 60 does not change the operation window 91 displayed on the operation display unit 67 of the operation display device 60 (Step S203). The operation display device 60 transmits the image data of the virtual operation window (the AR information) 93 created in Step S202 to the head-mounted display device 30 (Step S204). Then, the process is ended.

Figure 20:
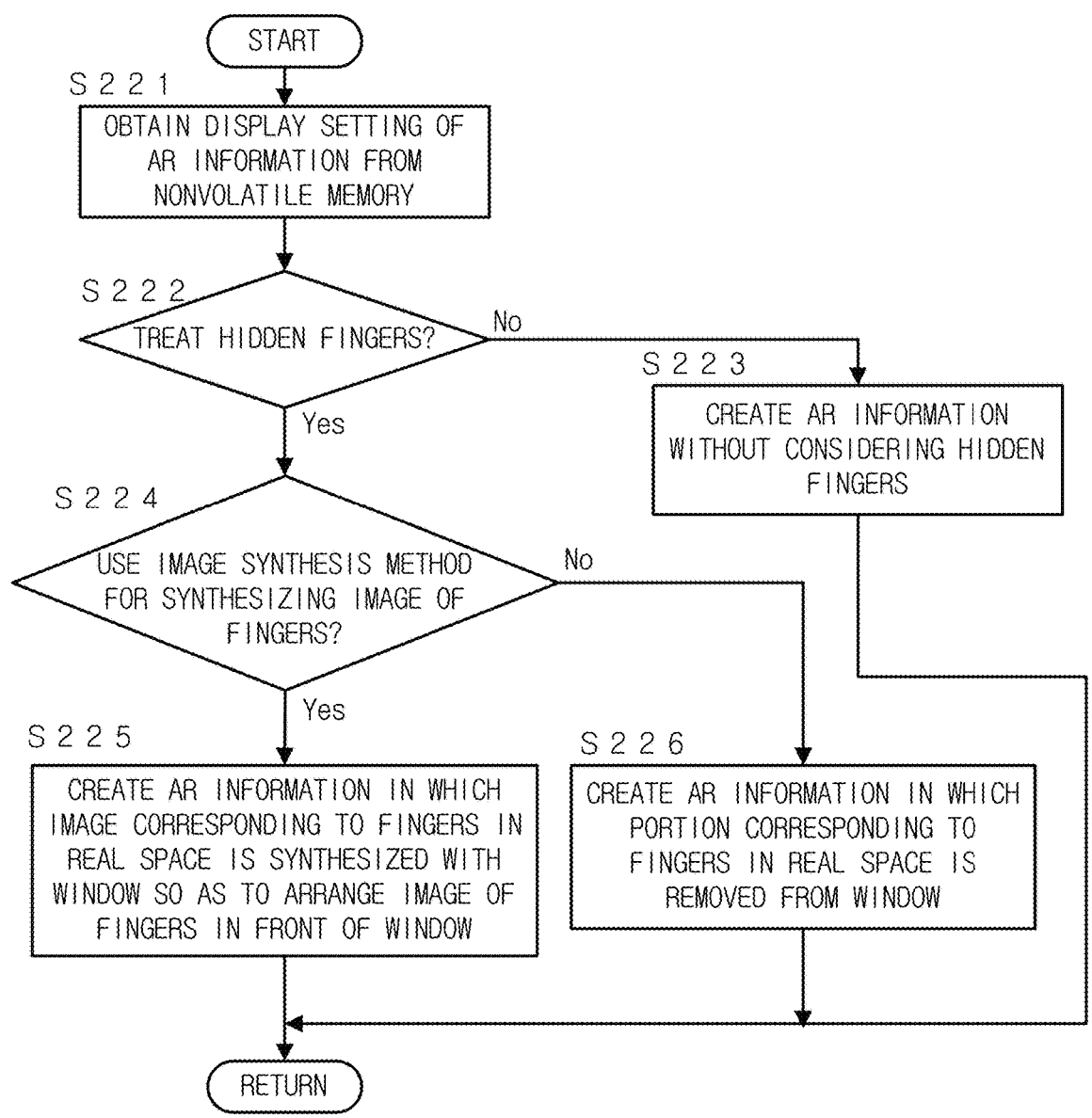
FIG. 20 is a flowchart showing the detail of the process in Step S202 of FIG. 19.

FIG. 20 shows the detail of the process in Step S202 of FIG. 19. Firstly, the operation display device 60 obtains the setting contents relating to the display setting of the AR information from the nonvolatile memory 64 (Step S221). The display setting of the AR information is the setting relating to the selectable conditions for the creation of the AR information (the virtual operation window 93). In this embodiment, the method for treating the hidden fingers 95 as shown in FIGS. 15 and 16 can be set as the conditions relating to the display setting of the AR information. The setting operation for setting the display setting of the AR information is previously received by using another setting window and the setting contents are stored in the nonvolatile memory 64.

In case that the setting contents relating to the display setting of the AR information (the method for treating the hidden fingers 95), which are read out from the nonvolatile memory 64, indicate that the hidden fingers 95 are not treated (Step S222; No), the operation display device 60 creates the AR information (the virtual operation window) without considering the hidden fingers 95 (Step S223). Then, this process is ended (return).

In case that the AR information is created without considering the hidden fingers 95, firstly, the operation window 91 which is currently displayed on the operation display device 60 is specified. The operation contents of the air operation to the operation window 91 are specified in accordance with the position and the type of the air operation indicated by the air operation information received from the head-mounted display device 30. For example, the air operation is specified as "the touch operation which is performed to the operation button 94 for the application settings". Next, the changed operation window to be displayed on the operation display unit 67 of the operation display device 60 in case that the specified operation is actually performed to the operation window 91 which is currently displayed, is created as the virtual operation window 93.

In case that the setting contents relating to the display setting of the AR information indicate that the hidden fingers 95 are treated by using the above-described image synthesis method (Step S222; Yes and Step S224; Yes), the operation display device 60 creates the AR information (the virtual operation window) in which the hidden fingers 95 are treated by using the image synthesis method (Step S225). Then, the process shown in FIG. 20 is ended (return). In detail, the virtual operation window 93 to be displayed in case that the hidden fingers 95 are not considered, is created as a basic window. Further, the image obtained by synthesizing the image 96 of the fingers with the above basic window so as to arrange the image 96 of the fingers on the relevant position of the basic window, is created as the AR information.

In case that the setting contents relating to the display setting of the AR information indicate that the hidden fingers 95 are treated by using the above-described removal method (Step S222; Yes and Step S224; No), the operation display device 60 creates the AR information (the virtual operation window) in which the hidden fingers 95 are treated by using the removal method (Step S226). Then, the process shown in FIG. 20 is ended (return). In detail, the virtual operation window 93 to be displayed in case that the hidden fingers 95 are not considered, is created as a basic window. Further, the image obtained by removing the removed portion 97 corresponding to the fingers from the above basic window, is created as the AR information.

As described above, in the operation display system 3, while the display state (the operation window 91) of the operation display device 60 which can be browsed and operated by a plurality of persons is maintained, the user who wears the head-mounted display device 30 performs a personal operation to the operation window 91 displayed on the operation display device 60. As a result, it is possible to confirm the operation window (the virtual operation window 93) changed in accordance with the personal operation in the head-mounted display device 30. Thereby, the user who wears the head-mounted display device 30 can perform a separate operation to the operation window 91 displayed on the operation display device 60 and can confirm the operation window 93 changed in accordance with the separate operation without causing inconvenience to other users. Further, in case that the personal information, such as the security information and the like is entered in accordance with the air operation, other persons are prevented from secretly viewing the personal information.

Further, the virtual operation window 93 is displayed so as to be just overlapped with the operation window 91 displayed on the operation display device 60 in the real space. Therefore, the user who wears the head-mounted display device 30 visually recognizes the virtual operation window 93 as if the display contents displayed on the operation display device 60 in the real space are changed in accordance with the air operation.

As shown in FIG. 13, the items set in accordance with the operation received by using the operation display device 60 and the items set in accordance with the air operation are displayed in the virtual operation window 93 so as to be distinguished from each other in different display forms. Therefore, it is possible to confirm whether each item is set in accordance with the air operation or not at a glance.

By combining the setting which is set in accordance with the operation received by using the operation display device 60 with the setting which is set in accordance with the air operation received from the user who wears the head-mounted display device 30, the setting peculiar to the user who wears the head-mounted display device 30 can be generated. Because the setting which is common to a plurality of users can be performed by using the operation display device 60, and the personal setting can be performed in accordance with the air operation, the work efficiency of performing a series of settings including the setting which is common to a plurality of persons and the personal setting, for each user can be improved. In addition, in case that the information is entered in accordance with the air operation, other users are prevented from secretly viewing the security information and the like.

In addition, because the hidden fingers 95 are treated, the user can perform the air operation to the virtual operation window 93 by viewing the fingers even if the virtual operation window 93 is non-transparently displayed so as to be overlapped with the operation window 91 displayed on the operation display device 60.

As described above, the embodiment is explained by using the drawings. However, in the present invention, the concrete configuration is not limited to the above embodiment. In the present invention, various modifications of the above embodiment or the addition of various functions or the like to the embodiment can be carried out without departing from the gist of the invention.

In the present embodiment, the air operation to the operation display device 60 is exemplified. However, the operation display unit 21 of the image processing apparatus 10 may have a function relating to the air operation, and the air operation may be performed to the operation display unit 21.

In the present embodiment, the air operation is detected by analyzing the image shot by the camera unit 47. However, the air operation may be detected by using other methods. For example, in order to detect the air operation, a method for emitting a sound wave or the like by the operation display device 60 and recognizing the movement and the position of fingers by using the reflected wave, may be used.

In the present embodiment, the air flick operation, the air touch operation, and the air gesture operation are detected as the air operation. The air operation to be detected may be one or more of the above air operations. In addition, the air gesture operation includes the action for drawing symbols or characters. Further, other actions, such as pinch-out, pinch-in and the like, may be recognized as the air operation.

The role sharing between the head-mounted display device 30 and the operation display device 60 is not limited to the sharing exemplified by the embodiment. The roles may be arbitrarily allocated. For example, the head-mounted display device 30 may have the function of the window creating unit 68 which creates the virtual operation window 93.

In this case, for example, the window data of all of the operation windows to be displayed on the operation display device 60 and the window change table are stored in the head-mounted display device 30. When the air operation is detected, the identification number and the like of the operation window 91 which is currently displayed are obtained from the operation display device 60 (alternatively, the image shot by the camera unit 47 is analyzed to identify the operation window). Then, the virtual operation window 93 to be displayed by changing the operation window 91 in accordance with the air operation may be created. In addition, the role sharing may be performed as follows. The image shot by the camera unit 47 may be transmitted to the operation display device 60 and the air operation may be detected by the operation display device 60.

In the present embodiment, the head-mounted display device 30 is used as the display device for displaying the augmented reality space. However, the portable terminal 80 comprising the camera unit may be used as the display device for displaying the augmented reality space. In the image shot by the camera unit, the portable terminal 80 detects the operation window 91 displayed on the operation display device 60 and the air operation to the operation window 91. Further, the portable terminal 80 creates the virtual operation window 93 corresponding to the air operation as the AR information, and operates so as to display the augmented reality space in which the AR information is synthesized with the real space shot by the camera unit, on the display unit.

The hidden fingers 95 may be treated also in other cases except the case in which the virtual operation window 93 is displayed so as to be overlapped with the operation window 91 displayed on the operation display device 60. The treatment of the hidden fingers 95 is useful also in case that the virtual operation window 93 is displayed at a different position from the operation window 91 displayed on the operation display device 60. That is, after the virtual operation window 93 is displayed, the air operation is performed to the virtual operation window 93. Therefore, it is preferable that the fingers are visually recognized so as not to be hidden behind the virtual operation window 93.

One of the objects of the above embodiment is to provide the operation display system and the operation display method in which while the display state of the operation display device which can be browsed and operated by a plurality of persons is maintained, a personal operation can be performed to the operation window displayed on the operation display device.

In the above embodiment, when the air operation which is performed to the operation window displayed on the operation display device by one user in the air apart from the display unit of the operation display device is detected, the virtual operation window in which the contents of the operation window which is currently displayed are changed in accordance with the air operation is created. Then, the augmented reality space in which the image of the virtual operation window is synthesized with the real space is displayed on the AR display unit so as to be viewed by the user who performs the air operation. On the other hand, even if the air operation is received, the operation window which is currently displayed on the operation display device is not changed. Therefore, while the display state of the operation display device which can be browsed and operated by a plurality of persons is maintained, the user who views the AR display unit can perform a personal operation to the operation window displayed on the operation display device and can confirm the operation window which is displayed in accordance with the personal operation.

In the above embodiment, the user who views the AR display unit can visually recognize the operation window which is displayed in accordance with the air operation, as if the operation window displayed on the operation display device in the real space is changed in accordance with the air operation.

In the above embodiment, the items set in accordance with the operation received by using the operating unit of the operation display device and the items set in accordance with the air operation are displayed in the virtual operation window so as to be distinguished from each other. For example, the items set in accordance with the operation received by using the operating unit of the operation display device and the items set in accordance with the air operation, for example, are displayed so as to be distinguished from each other by using different colors, different shapes, different font types, and the like.

In the above embodiment, the image of the fingers which are hidden behind the image of the virtual operation window is displayed by synthesizing the image of the fingers with the virtual operation window so as to arrange the image of the fingers in front of the virtual operation window.

In the above embodiment, the portion in which the fingers are positioned behind the image of the virtual operation window is eliminated from the image of the virtual operation window in order not to hide the fingers behind the image of the virtual operation window. The user who views the AR display unit can view the fingers through the eliminated portion of the virtual operation window.

In the above embodiment, by adding the personal setting contents set in accordance with the air operation to the setting contents set by using the operating unit, the setting peculiar to the user who performs the air operation can be generated. In case that the setting common to a plurality of persons is performed by using the operating unit, each person may add only his/her own peculiar setting. Therefore, the working process for performing the setting is reduced as compared to the case in which all of the settings are performed separately for each person from the start.

According to the operation display system and the operation display method, while the display state of the operation display device which can be browsed and operated by a plurality of persons is maintained, a personal operation can be performed to the operation window displayed on the operation display device.

The present U.S. patent application claims the priority of Japanese Patent Application No. 2013-27878, filed on Feb. 15, 2013, according to the Paris Convention, and the entirety of which is incorporated herein by reference for correction of incorrect translation.

What is claimed is:

1. An operation display system, comprising:
an operation display device comprising:
a display configured to display an operation window and to be browsed by a plurality of persons; and
a hardware processor configured:
to receive an operation to the operation window displayed on the display;
to change the operation window displayed on the display, in accordance with the received operation;
to detect an air operation which is an operation performed to the operation window displayed on the display by one user in air apart from the display;
to create a virtual operation window in which a content of the operation window is changed in accordance with the detected air operation;
an augmented reality (AR) display that displays an augmented reality space in which an image of the virtual operation window is synthesized with a real space,
wherein the hardware processor does not change the content of the operation window displayed on the display of the operation display device, in accordance with the air operation, when the one user performs an air operation which is the same as the operation for changing the content of the operation window displayed on the display of the operation display device, and
the operation display device and the AR display are separate devices.

2. The operation display system of claim 1, wherein the AR display displays the augmented reality space in which the image of the virtual operation window is synthesized so as to be overlapped with the display of the operation display device in the real space.

3. The operation display system of claim 1, wherein the AR display displays a first item set in accordance with the received operation and a second item set in accordance with the air operation so as to distinguish the first item from the second item in different display forms in the virtual operation window.

4. The operation display system of claim 1, wherein the AR display is included in an eyeglass type of head-mounted display device which is worn on a head of the one user.

5. The operation display system of claim 1, further comprising a camera to shoot the real space in an eye direction of the one user,
wherein the AR display detects fingers of the one user, which are hidden behind the image of the virtual operation window in the augmented reality space, from an image of the real space which is shot by the camera, and displays a synthesis image of the detected fingers with the image of the virtual operation window so as to arrange the image of the detected fingers in front of the image of the virtual operation window.

6. The operation display system of claim 1, further comprising a camera to shoot the real space in an eye direction of the one user,
wherein the AR display detects fingers of the one user, which are hidden behind the image of the virtual operation window in the augmented reality space, from an image of the real space which is shot by the camera, and displays a portion of the virtual operation window, except for a portion which hides the detected fingers.

7. The operation display system of claim 1, further comprising a camera to shoot the real space in an eye direction of the one user,
wherein the hardware processor detects the air operation by analyzing an image shot by the camera.

8. The operation display system of claim 1, wherein the air operation includes at least one of a flick operation in the air, a touch operation in the air and a gesture operation in the air.

9. The operation display system of claim 1, wherein a setting received by using the hardware processor and a setting received in accordance with the air operation from the one user are combined to generate a peculiar setting which is peculiar to the one user.

10. The operation display system of claim 1, wherein the hardware processor changes a content of the virtual operation window in accordance with the air operation.

11. The operation display system of claim 1, wherein the air operation instructs an input of user-specific information including security information of the one user.

12. An operation display method, comprising:
displaying an operation window on a display of an operation display device;
receiving an operation to the operation window by using a hardware processor of the operation display device;
changing the operation window in accordance with the received operation;
detecting an air operation which is an operation performed to the operation window displayed on the display by one user in air apart from the display;
creating a virtual operation window in which a content of the operation window is changed in accordance with the detected air operation;
displaying an augmented reality space, in which an image of the virtual operation window is synthesized with a real space, on an augmented reality display,
wherein the content of the operation window displayed on the display is not changed, in accordance with the air operation, when the one user performs an air operation which is the same as the operation for changing the content of the operation window displayed on the display of the operation display device, and
the operation display device and the augmented reality display are separate devices.

13. The operation display method of claim 12, wherein the augmented reality space in which the image of the virtual operation window is synthesized so as to be overlapped with the display of the operation display device in the real space, is shown to the one user.

14. The operation display method of claim 12, wherein in the virtual operation window, a first item set in accordance with the received operation received and a second item set in accordance with the air operation are displayed so as to distinguish the first item from the second item in different display forms.

15. The operation display method of claim 12, wherein the augmented reality space is shown to the one user by using an eyeglass type of head-mounted display device which is worn on a head of the one user.

16. The operation display method of claim 12, further comprising:
shooting the real space in an eye direction of the one user by using a camera;
detecting fingers of the one user, which are hidden behind the image of the virtual operation window in the augmented reality space, from an image of the real space which is shot by the camera; and
displaying a synthesis image of the detected fingers with the image of the virtual operation window so as to arrange the image of the detected fingers in front of the image of the virtual operation window.

17. The operation display method of claim 12, further comprising:
shooting the real space in an eye direction of the one user by using a camera;
detecting fingers of the one user, which are hidden behind the image of the virtual operation window in the augmented reality space, from an image of the real space which is shot by the camera; and
displaying a portion of the virtual operation window, except for a portion which hides the detected fingers.

18. The operation display method of claim 12, further comprising:
shooting the real space in an eye direction of the one user by using a camera,
wherein the air operation is detected by analyzing an image shot by the camera.

19. The operation display method of claim 12, wherein the air operation includes at least one of a flick operation in the air, a touch operation in the air and a gesture operation in the air.

20. The operation display method of claim 12, wherein a setting received by using the hardware processor and a setting received in accordance with the air operation from the one user are combined to generate a peculiar setting which is peculiar to the one user.

21. The operation display method of claim 12, wherein the hardware processor changes a content of the virtual operation window in accordance with the air operation.

* * * * *